US012793274B2

(12) United States Patent
Tan et al.

(10) Patent No.: US 12,793,274 B2
(45) Date of Patent: Nov. 10, 2026

(54) TRANSMISSION DEVICE FOR POINT CLOUD DATA, METHOD PERFORMED BY TRANSMISSION DEVICE, RECEPTION DEVICE FOR POINT CLOUD DATA, AND METHOD PERFORMED BY RECEPTION DEVICE

(71) Applicant: LG Electronics Inc., Seoul (KR)

(72) Inventors: Hendry Tan, Seoul (KR); Jinwon Lee, Seoul (KR); Jongyeul Suh, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/855,121

(22) PCT Filed: Apr. 14, 2023

(86) PCT No.: PCT/KR2023/005106
§ 371 (c)(1),
(2) Date: Oct. 8, 2024

(87) PCT Pub. No.: WO2023/200304
PCT Pub. Date: Oct. 19, 2023

(65) Prior Publication Data

US 2025/0259333 A1 Aug. 14, 2025

Related U.S. Application Data

(60) Provisional application No. 63/331,248, filed on Apr. 14, 2022.

(51) Int. Cl.
*G06T 9/00* (2006.01)
*H04N 19/31* (2014.01)

(52) U.S. Cl.
CPC ............... *G06T 9/00* (2013.01); *H04N 19/31* (2014.11)

(58) Field of Classification Search
CPC .... G06T 9/001; H04N 19/132; H04N 19/597; H04N 19/70
See application file for complete search history.

(56) References Cited

U.S. PATENT DOCUMENTS

2017/0347122 A1 11/2017 Chou et al.
2021/0029187 A1* 1/2021 Oh .......................... H04L 65/70
(Continued)

FOREIGN PATENT DOCUMENTS

KR 10-2018-0018662 A 2/2018
WO WO 2021/210837 A1 10/2021

OTHER PUBLICATIONS

N0504 (Text of ISO/IEC 23090-18 CDAM 1 Support of Temporal Scalabilityâ International Organization for Standardization Organisation Internationale de Normalisation ISO/IEC JTC 1/SC 29/WG 03 MPEG Systems ISO/IEC JTC 1/SC 29/WG 03 N0504 Mar. 2022, Virtual (Year: 2022).*
(Continued)

*Primary Examiner* — Fabio S Lima
(74) *Attorney, Agent, or Firm* — Fish & Richardson P.C.

(57) ABSTRACT

A transmission device of point cloud data, a method performed in the transmission device, a reception device, and a method performed in the reception device are provided. A method performed by a reception device of point cloud data may comprise obtaining a geometry-based point cloud compression (G-PCC) file including the point cloud data and obtaining a G-PCC temporal scalability group box GPCCTemporalScalabilityGroupBox from a track in the G-PCC file. A sample entry type of the track is one of 'gpel', 'gpeg', 'gpcl' or 'gpcg'.

5 Claims, 17 Drawing Sheets

(56) References Cited

U.S. PATENT DOCUMENTS

| | | | | |
|---|---|---|---|---|
| 2021/0176509 | A1* | 6/2021 | Maze | H04N 21/2353 |
| 2022/0109884 | A1 | 4/2022 | Ramasubramonian et al. | |
| 2022/0366611 | A1* | 11/2022 | Bai | H04N 21/8146 |
| 2023/0281923 | A1* | 9/2023 | Gudumasu | H04N 19/597 345/419 |
| 2025/0056049 | A1* | 2/2025 | Denoual | H04N 19/46 |

OTHER PUBLICATIONS

International Search Report and Written Opinion in International Appln. No. PCT/KR2023/005106, mailed on Jul. 19, 2023, 9 pages (with partial English translation).

MPEG Systems, "Text of ISO/IEC 23090-18 CDAM 1 Support of Temporal Scalability," N0504, ISO/IEC JTC 1/SC 29/WG 03, Apr. 5, 2022, 15 pages.

* cited by examiner

FIG. 10A

| tlv_encapsulation( ) { | **Descriptor** |
|---|---|
| **tlv_type** | u(8) |
| **tlv_num_payload_bytes** | u(32) |
| for( i = 0; i < tlv_num_payload_bytes; i++ ) | |
| **tlv_payload_byte**[ i ] | u(8) |
| } | |

FIG. 10B

| tlv_type | Syntax table | Description |
|---|---|---|
| 0 | 7.3.1.1 | Sequence parameter set |
| 1 | 7.3.1.2 | Geometry parameter set |
| 2 | 7.3.2.1 | Geometry data unit |
| 3 | 7.3.1.3 | Attribute parameter set |
| 4 | 7.3.3.1 | Attribute data unit |
| 5 | 7.3.2.2 | Tile inventory |
| 6 | 7.3.2.5 | Frame boundary marker |

(a)

(b)

TRANSMISSION DEVICE FOR POINT CLOUD DATA, METHOD PERFORMED BY TRANSMISSION DEVICE, RECEPTION DEVICE FOR POINT CLOUD DATA, AND METHOD PERFORMED BY RECEPTION DEVICE

CROSS-REFERENCE TO RELATED APPLICATIONS

This application is a National Stage application under 35 U.S.C. § 371 of International Application No. PCT/KR2023/005106, filed on Apr. 14, 2023, which claims the benefit of U.S. Provisional Application No. 63/331,248, filed on Apr. 14, 2022. The disclosures of the prior applications are incorporated by reference in their entirety.

TECHNICAL FIELD

The present disclosure relates to a method and device for processing point cloud content.

BACKGROUND ART

Point cloud content is expressed as a point cloud which is a set of points belonging to a coordinate system representing a three-dimensional space. The point cloud content may represent three-dimensional media and is used to provide various services such as virtual reality (VR), augmented reality (AR), mixed reality (MR) and self-driving services. Since tens of thousands to hundreds of thousands of point data are required to express point cloud content, a method of efficiently processing a vast amount of point data is required.

DISCLOSURE

Technical Problem

An object of the present disclosure is to provide a method and device for efficiently processing point cloud data. Another object of the present disclosure is to provide a point cloud data processing method and device for solving latency and encoding/decoding complexity.

Another object of the present disclosure is to provide a method and device for supporting a temporal scalability track group.

Another object of the present disclosure is to provide a method and device for processing a file storage technique to support efficient access to a stored G-PCC bitstream.

The technical problems solved by the present disclosure are not limited to the above technical problems and other technical problems which are not described herein will become apparent to those skilled in the art from the following description.

Technical Solution

A method performed in a reception device of point cloud data according to an embodiment of the present disclosure may comprise obtaining a geometry-based point cloud compression (G-PCC) file including the point cloud data and obtaining a G-PCC temporal scalability group box GPCCTemporalScalabilityGroupBox from a track in the G-PCC file. A sample entry type of the track may be one of 'gpel', 'gpeg', 'gpcl' or 'gpcg'.

According to an embodiment of the present disclosure, the track may include a geometry component.

According to an embodiment of the present disclosure, the sample entry type of the track may be one of 'gpcl' or 'gpcg'.

According to an embodiment of the present disclosure, based on the track including an attribute component and the sample entry type of the track being 'gpcl' or 'gpcg', the G-PCC temporal scalability group box may not be obtained from the track.

According to an embodiment of the present disclosure, based on first tracks included in a same temporal scalability group box being combined, second tracks referred to by the first tracks may be combined, the first tracks may be tracks including a geometry component, and the second tracks may be tracks including an attribute component.

According to an embodiment of the present disclosure, the first tracks may be combined based on the sample entry type of the track being one of 'gpcl' or 'gpcg'.

A method performed in a transmission device of point cloud data according to an embodiment of the present disclosure may comprise generating a track including a G-PCC temporal scalability group box GPCCTemporalScalabilityGroupBox and generating a G-PCC file including the track. A sample entry type of the track may be one of 'gpel', 'gpeg', 'gpcl' or 'gpcg'.

A reception device of point cloud data according to another embodiment of the present disclosure may comprise a memory and at least one processor. The at least one processor may obtain a geometry-based point cloud compression (G-PCC) file including the point cloud data and obtain a G-PCC temporal scalability group box GPCCTemporalScalabilityGroupBox from a track in the G-PCC file. A sample entry type of the track may be one of 'gpel', 'gpeg', 'gpcl' or 'gpcg'.

A transmission device of point cloud data according to another embodiment of the present disclosure may comprise a memory and at least one processor. The at least one processor may generate a track including a G-PCC temporal scalability group box GPCCTemporalScalabilityGroupBox and generate a G-PCC file including the track. A sample entry type of the track may be one of 'gpel'. 'gpeg', 'gpcl' or 'gpcg'.

Advantageous Effects

A device and method according to embodiments of the present disclosure may process point cloud data with high efficiency.

A device and method according to embodiments of the present disclosure may provide a high-quality point cloud service.

A device and method according to embodiments of the present disclosure may provide a point cloud content for providing a general purpose service such as a VR service and a self-driving service.

A device and method according to embodiments of the present disclosure may provide temporal scalability capable of effectively accessing a desired component among G-PCC components.

A device and method according to embodiments of the present disclosure may provide a temporal scalability track group, thereby preventing temporal tracks from being mixed.

A device and method according to embodiments of the present disclosure may perform temporal scalability grouping when there are a plurality of temporal level tracks, thereby reducing bits.

DESCRIPTION OF DRAWINGS

FIG. 10 illustrates an example for a TLV encapsulation syntax structure and a payload type according to embodiments of the present disclosure.

MODE FOR INVENTION

Figure 1:
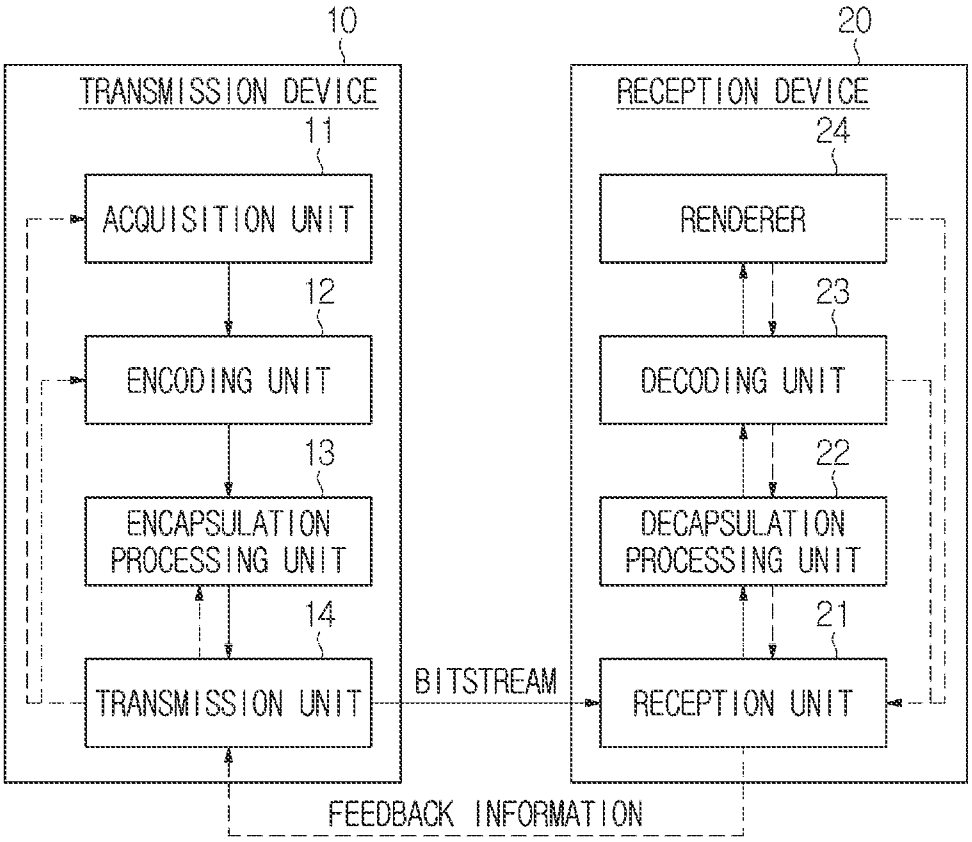
FIG. 1 is a block diagram illustrating an example of a point cloud content provision system according to embodiments of the present disclosure.

Hereinafter, embodiments of the present disclosure will be described in detail with reference to the accompanying drawings so that those of ordinary skill in the art to which the present disclosure pertains can easily implement them. The present disclosure may be embodied in several different forms and is not limited to the embodiments described herein.

In describing the present disclosure, a detailed description of known functions and configurations will be omitted when it may obscure the subject matter of the present disclosure. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which another component exists in therebetween. In addition, when it is said that a component "includes" or "has" another component, this indicates that the other components are not excluded, but may be further included unless specially described.

In the present disclosure, terms such as first, second, etc. are used only for the purpose of distinguishing one component from other components, and, unless otherwise specified, the order or importance of the components is not limited. Accordingly, within the scope of the present disclosure, a first component in one embodiment may be referred to as a second component in another embodiment, and, similarly, a second component in one embodiment is referred to as a first component in another embodiment.

In the present disclosure, components that are distinguished from each other are for clearly explaining features thereof, and do not necessarily mean that the components are separated. That is, a plurality of components may be integrated to form one hardware or software unit, or one component may be distributed to form a plurality of hardware or software units. Accordingly, even if not specifically mentioned, such integrated or distributed embodiments are also included in the scope of the present disclosure.

In the present disclosure, components described in various embodiments do not necessarily mean essential components, and some thereof may be optional components. Accordingly, an embodiment composed of a subset of components described in one embodiment is also included in the scope of the present disclosure. In addition, embodiments including other components in addition to components described in various embodiments are also included in the scope of the present disclosure.

The present disclosure relates to encoding and decoding of point cloud-related data, and terms used in the present disclosure may have general meanings commonly used in the technical field to which the present disclosure belongs unless they are newly defined in the present disclosure.

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to compression of point cloud-related data. Various methods or embodiments of the present disclosure may be applied to a point cloud compression or point cloud coding (PCC) standard (e.g., G-PCC or V-PCC standard) of a moving picture experts group (MPEG) or a next-generation video/image coding standard.

In the present disclosure, a "point cloud" may mean a set of points located in a three-dimensional space. Also, in the present disclosure, "point cloud content" is expressed as a point cloud, and may mean a "point cloud video/image". Hereinafter, the 'point cloud video/image' is referred to as a 'point cloud video'. A point cloud video may include one or more frames, and one frame may be a still image or a picture. Accordingly, the point cloud video may include a point cloud image/frame/picture, and may be referred to as any one of a "point cloud image", a "point cloud frame", and a "point cloud picture".

In the present disclosure, "point cloud data" may mean data or information related to each point in the point cloud. Point cloud data may include geometry and/or attribute. In addition, the point cloud data may further include metadata. The point cloud data may be referred to as "point cloud content data" or "point cloud video data" or the like. In addition, the point cloud data may be referred to as "point cloud content", "point cloud video", "G-PCC data", and the like.

In the present disclosure, a point cloud object corresponding to point cloud data may be represented in a box shape based on a coordinate system, and the box shape based on the coordinate system may be referred to as a bounding box. That is, the bounding box may be a rectangular cuboid capable of accommodating all points of the point cloud, and may be a cuboid including a source point cloud frame.

In the present disclosure, geometry includes the position (or position information) of each point, and the position may be expressed by parameters (e.g., for example, an x-axis value, a y-axis value, and a z-axis value) representing a three-dimensional coordinate system (e.g., a coordinate system consisting of an x-axis, y-axis, and z-axis). The geometry may be referred to as "geometric information".

In the present disclosure, the attribute may include properties of each point, and the properties may include one or more of texture information, color (RGB or YCbCr), reflectance (r), transparency, etc. of each point. The attribute may be referred to as "attribute information". Metadata may include various data related to acquisition in an acquisition process to be described later.

Overview of Point Cloud Content Provision System

Figure 2:
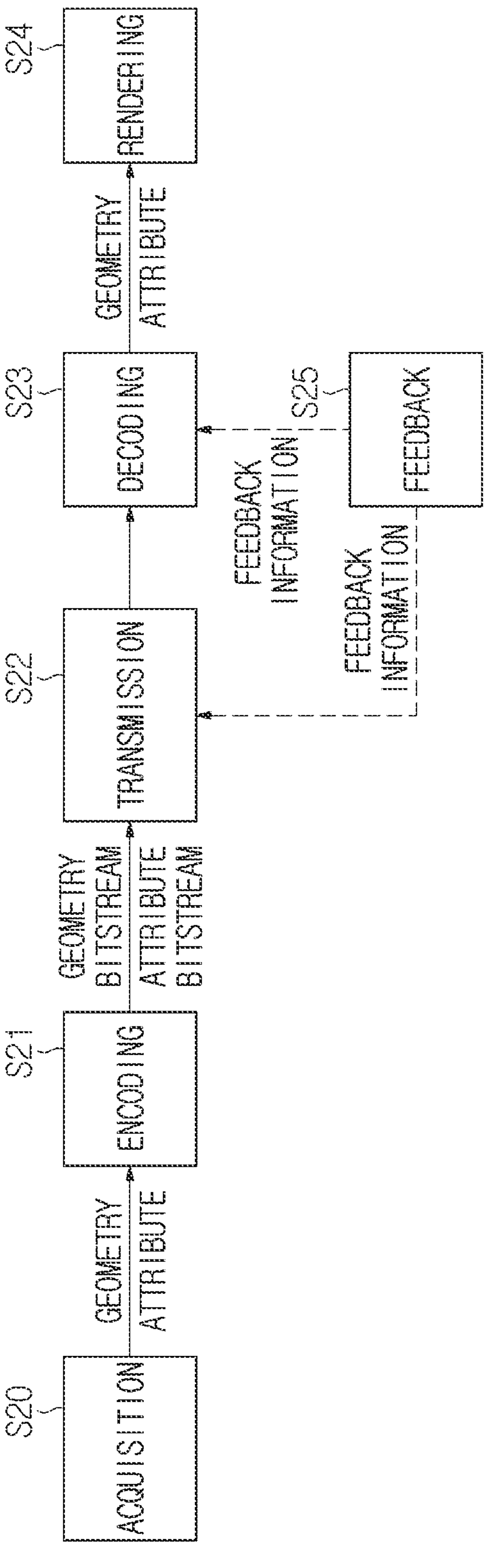
FIG. 2 is a block diagram illustrating an example of a point cloud content provision process according to embodiments of the present disclosure.

FIG. 1 illustrates an example of a system for providing point cloud content (hereinafter, referred to as a 'point cloud content provision system') according to embodiments of the present disclosure. FIG. 2 illustrates an example of a process in which the point cloud content provision system provides point cloud content.

As shown in FIG. 1, the point cloud content provision system may include a transmission device 10 and a reception device 20. The point cloud content provision system may perform an acquisition process S20, an encoding process S21, a transmission process S22, a decoding process S23, a rendering process S24 and/or a feedback process S25 shown in FIG. 2 by operation of the transmission device 10 and the reception device 20.

The transmission device 10 acquires point cloud data and outputs a bitstream through a series of processes (e.g., encoding process) for the acquired point cloud data (source point cloud data), in order to provide point cloud content. Here, the point cloud data may be output in the form of a bitstream through an encoding process. In some embodiments, the transmission device 10 may transmit the output bitstream in the form of a file or streaming (streaming segment) to the reception device 20 through a digital storage medium or a network. The digital storage medium may include a variety of storage media such as USB, SD, CD, DVD, Blu-ray, HDD, and SSD. The reception device 20 may process (e.g., decode or reconstruct) the received data (e.g., encoded point cloud data) into source point cloud data and render it. The point cloud content may be provided to the user through these processes, and the present disclosure may provide various embodiments necessary to effectively perform a series of these processes.

As illustrated in FIG. 1, the transmission device 10 may include an acquisition unit 11, an encoding unit 12, an encapsulation processing unit 13 and a transmission unit 14, and the reception device 20 may include a reception unit 21, a decapsulation processing unit 22, a decoding unit 23, and a rendering unit 24.

The acquisition unit 11 may perform a process S20 of acquiring a point cloud video through a capturing, synthesizing or generating process. Accordingly, the acquisition unit 11 may be referred to as a 'point cloud video acquisition unit'.

Point cloud data (geometry and/or attribute, etc.) for a plurality of points may be generated by the acquisition process (S20). Also, through the acquisition process (S20), metadata related to the acquisition of the point cloud video may be generated. Also, mesh data (e.g., triangular data) indicating connection information between point clouds may be generated by the acquisition process (S20).

The metadata may include initial viewing orientation metadata. The initial viewing orientation metadata may indicate whether the point cloud data is data representing the front or the back. The metadata may be referred to as "auxiliary data" that is metadata for the point cloud.

The acquired point cloud video may include the polygon file format or the Stanford triangle format (PLY) file. Since the point cloud video has one or more frames, the acquired point cloud video may include one or more PLY files. The PLY file may include point cloud data of each point.

In order to acquire a point cloud video (or point cloud data), the acquisition unit 11 may be composed of a combination of camera equipment capable of acquiring depth (depth information) and RGB cameras capable of extracting color information corresponding to the depth information. Here, the camera equipment capable of acquiring the depth information may be a combination of an infrared pattern projector and an infrared camera. In addition, the acquisition unit 11 may be composed of a LiDAR, and the LiDAR may use a radar system for measuring the position coordinates of a reflector by measuring a time required for a laser pulse to be emitted and returned after being reflected.

The acquisition unit 110 may extract a shape of geometry composed of points in a three-dimensional space from the depth information, and may extract an attribute representing a color or reflection of each point from the RGB information.

As a method of extracting (or capturing, acquiring, etc.) a point cloud video (or point cloud data), there may be an inward-facing method of capturing a central object and an outward-facing method of capturing an external environment.

The encoding unit 12 may perform the encoding process (S21) of encoding the data (e.g., geometry, attribute and/or metadata, and/or mesh data, etc.) generated by the acquisition unit 11 into one or more bitstreams. Accordingly, the encoding unit 12 may be referred to as a 'point cloud video encoder'. The encoding unit 12 may encode the data generated by the acquisition unit 11 in series or in parallel.

The encoding process S21 performed by the encoding unit 12 may be geometry-based point cloud compression (G-PCC). The encoding unit 12 may perform a series of procedures such as prediction, transform, quantization, and entropy coding for compression and coding efficiency.

The encoded point cloud data may be output in the form of a bitstream. Based on the G-PCC procedure, the encoding unit 12 may partition the point cloud data into geometry and attribute and encode them as described below. In this case, the output bitstream may include a geometry bitstream including the encoded geometry and an attribute bitstream including the encoded attribute. In addition, the output bitstream may further include one or more of a metadata bitstream including metadata, an auxiliary bitstream including auxiliary data, and a mesh data bitstream including mesh data. The encoding process (S21) will be described in more detail below. A bitstream including the encoded point cloud data may be referred to as a 'point cloud bitstream' or a 'point cloud video bitstream'.

The encapsulation processing unit 13 may perform a process of encapsulating one or more bitstreams output from the decoding unit 12 in the form of a file or a segment. Accordingly, the encapsulation processing unit 13 may be referred to as a 'file/segment encapsulation module'. Although the drawing shows an example in which the encapsulation processing unit 13 is composed of a separate component/module in relation to the transmission unit 14, the encapsulation processing unit 13 may be included in the transmission unit 14 in some embodiments.

The encapsulation processing unit 13 may encapsulate the data in a file format such as ISO Base Media File Format (ISOBMFF) or process the data in the form of other DASH segments. In some embodiments, the encapsulation processing unit 13 may include metadata in a file format. Metadata may be included, for example, in boxes of various levels in the ISOBMFF file format, or as data in a separate track within the file. In some embodiments, the encapsulation processing unit 130 may encapsulate the metadata itself into a file. The metadata processed by the encapsulation processing unit 13 may be transmitted from a metadata processing unit not shown in the drawing. The metadata processing unit may be included in the encoding unit 12 or may be configured as a separate component/module.

The transmission unit 14 may perform the transmission process (S22) of applying processing (processing for transmission) according to a file format to the 'encapsulated point cloud bitstream'. The transmission unit 140 may transmit the bitstream or a file/segment including the bitstream to the reception unit 21 of the reception device 20 through a digital storage medium or a network. Accordingly, the transmission unit 14 may be referred to as a 'transmitter' or a 'communication module'.

The transmission unit 14 may process point cloud data according to an arbitrary transmission protocol. Here, 'processing the point cloud data according to the arbitrary transmission protocol' may be 'processing for transmission'. The processing for transmission may include processing for transmission through a broadcast network, processing for transmission through a broadband, and the like. In some embodiments, the transmission unit 14 may receive not only point cloud data but also metadata from the metadata processing unit, and may perform processing for transmission on the transmitted metadata. In some embodiments, the processing for transmission may be performed by the transmission processing unit, and the transmission processing unit may be included in the transmission unit 14 or configured as a component/module separate from the transmission unit 14.

The reception unit 21 may receive the bitstream transmitted by the transmission device 10 or a file/segment including the bitstream. Depending on the transmitted channel, the reception unit 21 may receive a bitstream or a file/segment including the bitstream through a broadcast network, or may receive a bitstream or a file/segment including the bitstream through a broadband. Alternatively, the reception unit 21 may receive a bitstream or a file/segment including the bitstream through a digital storage medium.

The reception unit 21 may perform processing according to a transmission protocol on the received bitstream or the file/segment including the bitstream. The reception unit 21 may perform a reverse process of transmission processing (processing for transmission) to correspond to processing for transmission performed by the transmission device 10. The reception unit 21 may transmit the encoded point cloud data among the received data to the decapsulation processing unit 22 and may transmit metadata to a metadata parsing unit. The metadata may be in the form of a signaling table. In some embodiments, the reverse process of the processing for transmission may be performed in the reception processing unit. Each of the reception processing unit, the decapsulation processing unit 22, and the metadata parsing unit may be included in the reception unit 21 or may be configured as a component/module separate from the reception unit 21.

The decapsulation processing unit 22 may decapsulate the point cloud data (i.e., a bitstream in a file format) in a file format received from the reception unit 21 or a reception processing unit. Accordingly, the decapsulation processing unit 22 may be referred to as a 'file/segment decapsulation module'.

The decapsulation processing unit 22 may acquire a point cloud bitstream or a metadata bitstream by decapsulating files according to ISOBMFF or the like. In some embodiments, metadata (metadata bitstream) may be included in the point cloud bitstream. The acquired point cloud bitstream may be transmitted to the decoding unit 23, and the acquired metadata bitstream may be transmitted to the metadata processing unit. The metadata processing unit may be included in the decoding unit 23 or may be configured as a separate component/module. The metadata obtained by the decapsulation processing unit 23 may be in the form of a box or track in a file format. If necessary, the decapsulation processing unit 23 may receive metadata required for decapsulation from the metadata processing unit. The metadata may be transmitted to the decoding unit 23 and used in the decoding process (S23), or may be transmitted to the rendering unit 24 and used in the rendering process (S24).

The decoding unit 23 may receive the bitstream and perform operation corresponding to the operation of the encoding unit 12, thereby performing the decoding process (S23) of decoding the point cloud bitstream (encoded point cloud data). Accordingly, the decoding unit 23 may be referred to as a 'point cloud video decoder'.

The decoding unit 23 may partition the point cloud data into geometry and attribute and decode them. For example, the decoding unit 23 may reconstruct (decode) geometry from a geometry bitstream included in the point cloud bitstream, and restore (decode) attribute based on the reconstructed geometry and an attribute bitstream included in the point cloud bitstream. A three-dimensional point cloud video/image may be reconstructed based on position information according to the reconstructed geometry and attribute (such as color or texture) according to the decoded attribute. The decoding process (S23) will be described in more detail below.

The rendering unit 24 may perform the rendering process S24 of rendering the reconstructed point cloud video. Accordingly, the rendering unit 24 may be referred to as a 'renderer'.

The rendering process S24 may refer to a process of rendering and displaying point cloud content in a 3D space. The rendering process S24 may perform rendering according to a desired rendering method based on the position information and attribute information of the points decoded through the decoding process.

The feedback process S25 may include a process of transmitting various feedback information that may be acquired during the rendering process S24 or the display process to the transmission device 10 or to other components in the reception device 20. The feedback process S25 may be performed by one or more of the components included in the reception device 20 of FIG. 1 or may be performed by one or more of the components shown in FIGS. 10 and 11. In some embodiments, the feedback process S25 may be performed by a 'feedback unit' or a 'sensing/tracking unit'.

Overview of Point Cloud Encoding Apparatus

Figure 3:
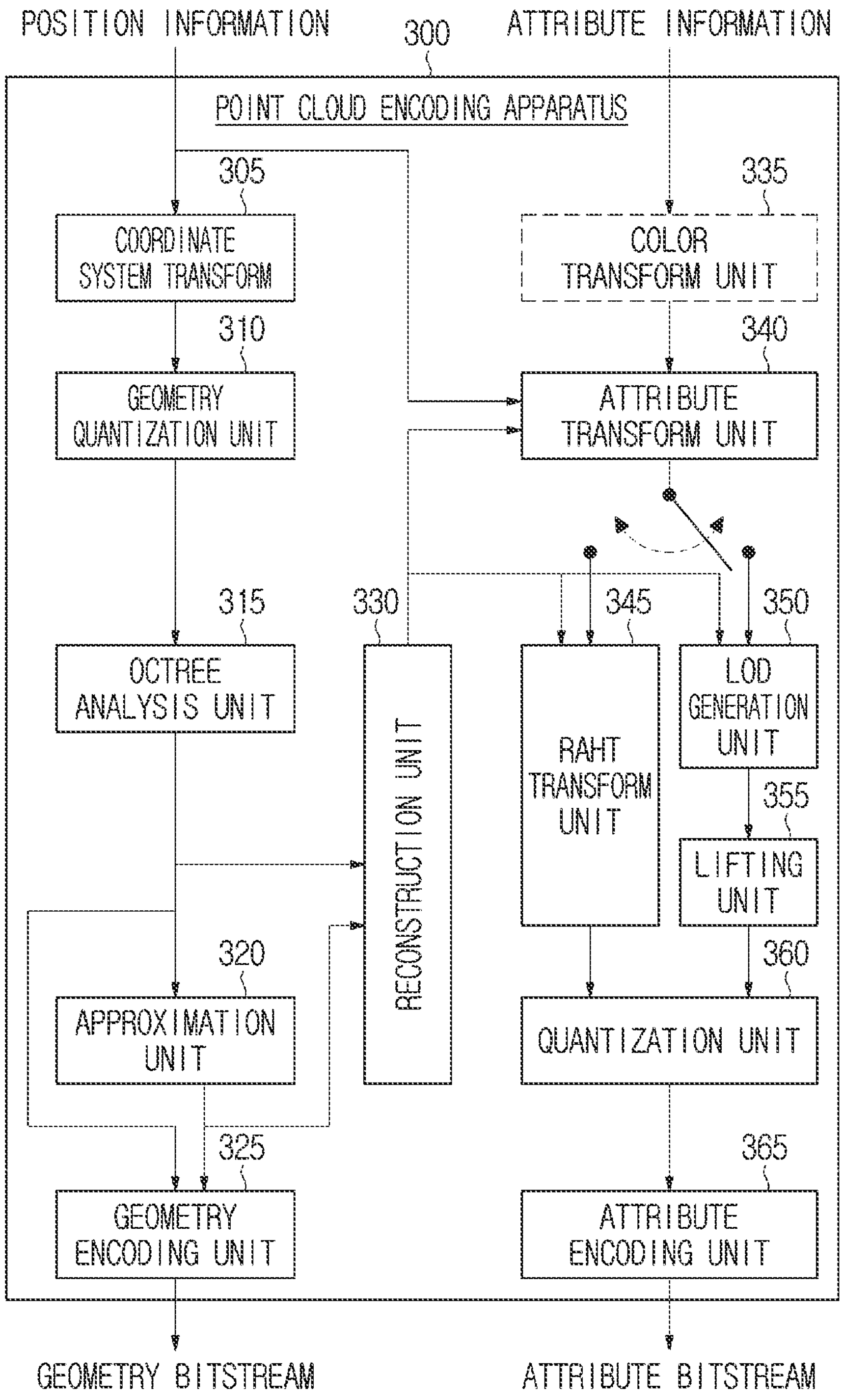
FIG. 3 is a diagram illustrating an example of a point cloud encoding apparatus according to embodiments of the present disclosure.

FIG. 3 illustrates an example of a point cloud encoding apparatus 300 according to embodiments of the present disclosure. The point cloud encoding apparatus 300 of FIG. 3 may correspond to the encoding unit 12 of FIG. 1 in terms of the configuration and function.

As shown in FIG. 3, the point cloud encoding apparatus 300 may include a coordinate system transform unit 305, a geometry quantization unit 310, an octree analysis unit 315, an approximation unit 320, a geometry encoding unit 325, a reconstruction unit 330, and an attribute transform unit 340, a RAHT transform unit 345, an LOD generation unit 350, a lifting unit 355, an attribute quantization unit 360, an attribute encoding unit 365, and/or a color transform unit 335.

The point cloud data acquired by the acquisition unit 11 may undergo processes of adjusting the quality of the point cloud content (e.g., lossless, lossy, near-lossless) according to the network situation or application. In addition, each point of the acquired point cloud content may be transmitted without loss, but, in that case, real-time streaming may not be possible because the size of the point cloud content is large. Therefore, in order to provide the point cloud content smoothly, a process of reconstructing the point cloud content according to a maximum target bitrate is required.

Processes of adjusting the quality of the point cloud content may be processes of reconstructing and encoding the position information (position information included in the geometry information) or color information (color information included in the attribute information) of the points. A process of reconstructing and encoding position information of points may be referred to as geometry coding, and a process of reconstructing and encoding attribute information associated with each point may be referred to as attribute coding.

Geometry coding may include a geometry quantization process, a voxelization process, an octree analysis process, an approximation process, a geometry encoding process, and/or a coordinate system transform process. Also, geometry coding may further include a geometry reconstruction process. Attribute coding may include a color transform process, an attribute transform process, a prediction transform process, a lifting transform process, a RAHT transform process, an attribute quantization process, an attribute encoding process, and the like.

Geometry Coding

The coordinate system transform process may correspond to a process of transforming a coordinate system for positions of points. Therefore, the coordinate system transform process may be referred to as 'transform coordinates'. The coordinate system transform process may be performed by the coordinate system transform unit 305. For example, the coordinate system transform unit 305 may transform the positions of the points from the global space coordinate system to position information in a three-dimensional space (e.g., a three-dimensional space expressed in coordinate system of the X-axis, Y-axis, and Z-axis). Position information in the 3D space according to embodiments may be referred to as 'geometric information'.

The geometry quantization process may correspond to a process of quantizing the position information of points, and may be performed by the geometry quantization unit 310. For example, the geometry quantization unit 310 may find position information having minimum (x, y, z) values among the position information of the points, and subtract position information having the minimum (x, y, z) positions from the position information of each point. In addition, the geometry quantization unit 310 may multiply the subtracted value by a preset quantization scale value, and then adjust (lower or raise) the result to a near integer value, thereby performing the quantization process.

The voxelization process may correspond to a process of matching geometry information quantized through the quantization process to a specific voxel present in a 3D space. The voxelization process may also be performed by the geometry quantization unit 310. The geometry quantization unit 310 may perform octree-based voxelization based on position information of the points, in order to reconstruct each point to which the quantization process is applied.

The geometry encoding process may correspond to a process of performing entropy coding on the occupancy code. The geometry encoding process may be performed by the geometry encoding unit 325. The geometry encoding unit 325 may perform entropy coding on the occupancy code. The generated occupancy code may be immediately encoded or may be encoded through an intra/inter coding process to increase compression efficiency. The reception device 20 may reconstruct the octree through the occupancy code.

On the other hand, in the case of a specific area having no points or very few points, it may be inefficient to voxelize all areas. That is, since there are few points in a specific area, it may not be necessary to construct the entire octree. For this case, an early termination method may be required.

The point cloud encoding apparatus 300 may directly transmit the positions of points only for the specific area, or reconfigure positions of points within the specific area based on the voxel using a surface model, instead of partitioning a node (specific node) corresponding to this specific area into 8 sub-nodes (children nodes) for the specific area (a specific area that does not correspond to a leaf node).

A mode for directly transmitting the position of each point for a specific node may be a direct mode. The point cloud encoding apparatus 300 may check whether conditions for enabling the direct mode are satisfied.

The conditions for enabling the direct mode are: 1) the option to use the direct mode shall be enabled, 2) the specific node does not correspond to a leaf node, and 3) points below a threshold shall exist within the specific node, and 4) the total number of points to be directly transmitted does not exceed a limit value.

When all of the above conditions are satisfied, the point cloud encoding apparatus 300 may entropy-code and transmit the position value of the point directly for the specific node through the geometry encoding unit 325.

A mode in which a position of a point in a specific area is reconstructed based on a voxel using a surface model may be a trisoup mode. The trisoup mode may be performed by the approximation unit 320. The approximation unit 320 may determine a specific level of the octree and reconstruct the positions of points in the node area based on the voxel using the surface model from the determined specific level.

The point cloud encoding apparatus 300 may selectively apply the trisoup mode. Specifically, the point cloud encoding apparatus 300 may designate a level (specific level) to which the trisoup mode is applied, when the trisoup mode is used. For example, when the specified specific level is equal to the depth (d) of the octree, the trisoup mode may not be applied. That is, the designated specific level shall be less than the depth value of the octree.

A three-dimensional cubic area of nodes of the designated specific level is called a block, and one block may include one or more voxels. A block or voxel may correspond to a brick. Each block may have 12 edges, and the approximation unit 320 may check whether each edge is adjacent to an occupied voxel having a point. Each edge may be adjacent to several occupied voxels. A specific position of an edge adjacent to a voxel is called a vertex, and, when a plurality of occupied voxels are adjacent to one edge, the approximation unit 320 may determine an average position of the positions as a vertex.

The point cloud encoding apparatus 300 may entropy-code the starting points (x, y, z) of the edge, the direction vector (Δx, Δy, Δz) of the edge and position value of the vertex (relative position values within the edge) through the geometry encoding unit 325, when a vertex is present.

The geometry reconstruction process may correspond to a process of generating a reconstructed geometry by reconstructing an octree and/or an approximated octree. The geometry reconstruction process may be performed by the reconstruction unit 330. The reconstruction unit 330 may perform a geometry reconstruction process through triangle reconstruction, up-sampling, voxelization, and the like.

When the trisoup mode is applied in the approximation unit 320, the reconstruction unit 330 may reconstruct a triangle based on the starting point of the edge, the direction vector of the edge and the position value of the vertex.

The reconstruction unit 330 may perform an upsampling process for voxelization by adding points in the middle along the edge of the triangle. The reconstruction unit 330 may generate additional points based on an upsampling factor and the width of the block. These points may be called refined vertices. The reconstruction unit 330 may voxel the refined vertices, and the point cloud encoding apparatus 300 may perform attribute coding based on the voxelized position value.

In some embodiments, the geometry encoding unit 325 may increase compression efficiency by applying context adaptive arithmetic coding. The geometry encoding unit 325 may directly entropy-code the occupancy code using the arithmetic code. In some embodiments, the geometry encoding unit 325 adaptively performs encoding based on occupancy of neighbor nodes (intra coding), or adaptively performs encoding based on the occupancy code of a previous frame (inter-coding). Here, the frame may mean a set of point cloud data generated at the same time. Intra coding and inter coding are optional processes and thus may be omitted.

Attribute Coding

Attribute coding may correspond to a process of coding attribute information based on reconstructed geometry and geometry before coordinate system transform (source geometry). Since the attribute may be dependent on the geometry, the reconstructed geometry may be utilized for attribute coding.

As described above, the attribute may include color, reflectance, and the like. The same attribute coding method may be applied to information or parameters included in the attribute. Color has three elements, reflectance has one element, and each element can be processed independently.

Attribute coding may include a color transform process, an attribute transform process, a prediction transform process, a lifting transform process, a RAHT transform process, an attribute quantization process, an attribute encoding process, and the like. The prediction transform process, the lifting transform process, and the RAHT transform process may be selectively used, or a combination of one or more thereof may be used.

The color transform process may correspond to a process of transforming the format of the color in the attribute into another format. The color transform process may be performed by the color transform unit 335. That is, the color transform unit 335 may transform the color in the attribute. For example, the color transform unit 335 may perform a coding operation for transforming the color in the attribute from RGB to YCbCr. In some embodiments, the operation of the color transform unit 335, that is, the color transform process, may be optionally applied according to a color value included in the attribute.

As described above, when one or more points exist in one voxel, position values for points existing in the voxel are set to the center point of the voxel in order to display them by integrating them into one point information for the voxel. Accordingly, a process of transforming the values of attributes related to the points may be required. Also, even when the trisoup mode is performed, the attribute transform process may be performed.

The attribute transform process may correspond to a process of transforming the attribute based on a position on which geometry coding is not performed and/or reconstructed geometry. For example, the attribute transform process may correspond to a process of transforming the attribute having a point of the position based on the position of a point included in a voxel. The attribute transform process may be performed by the attribute transform unit 340.

The attribute transform unit 340 may calculate the central position value of the voxel and an average value of the attribute values of neighbor points within a specific radius. Alternatively, the attribute transform unit 340 may apply a weight according to a distance from the central position to the attribute values and calculate an average value of the attribute values to which the weight is applied. In this case, each voxel has a position and a calculated attribute value.

The prediction transform process may correspond to a process of predicting an attribute value of a current point based on attribute values of one or more points (neighbor points) adjacent to the current point (a point corresponding to a prediction target). The prediction transform process may be performed by a level-of-detail (LOD) generation unit 350.

Prediction transform is a method to which the LOD transform technique is applied, and the LOD generation unit 350 may calculate and set the LOD value of each point based on the LOD distance value of each point.

The LOD generation unit 350 may generate a predictor for each point for prediction transform. Accordingly, when there are N points, N predictors may be generated. The predictor may calculate and set a weight value (=1/distance) based on the LOD value for each point, the indexing information for the neighbor points, and distance values from the neighbor points. Here, the neighbor points may be points existing within a distance set for each LOD from the current point.

In addition, the predictor may multiply the attribute values of neighbor points by the 'set weight value', and set a value obtained by averaging the attribute values multiplied by the weight value as the predicted attribute value of the current point. An attribute quantization process may be performed on a residual attribute value obtained by subtracting the predicted attribute value of the current point from the attribute value of the current point.

The lifting transform process may correspond to a process of reconstructing points into a set of detail levels through the LOD generation process, like the prediction transform process. The lifting transform process may be performed by the lifting unit 355. The lifting transform process may also include a process of generating a predictor for each point, a process of setting the calculated LOD in the predictor, a process of registering neighbor points, and a process of setting a weight according to distances between the current point and the neighbor points.

The RAHT transform process may correspond to a method of predicting attribute information of nodes at a higher level using attribute information associated with a node at a lower level of the octree. That is, the RATH transform process may correspond to an attribute information intra coding method through octree backward scan. The RAHT transform process may be performed by the RAHT transform unit 345.

The RAHT transform unit 345 scans the entire area in the voxel, and may perform the RAHT transform process up to the root node while summing (merging) the voxel into a larger block at each step. Since the RAHT transform unit 345 performs a RAHT transform process only on an occupied node, in the case of an empty node that is not occupied, the RAHT transform process may be performed on a node at a higher level immediately above it.

The attribute quantization process may correspond to a process of quantizing the attribute output from the RAHT transform unit 345, the LOD generation unit 350, and/or the lifting unit 355. The attribute quantization process may be performed by the attribute quantization unit 360. The attribute encoding process may correspond to a process of encoding a quantized attribute and outputting an attribute bitstream. The attribute encoding process may be performed by the attribute encoding unit 365.

Overview of Point Cloud Decoding Apparatus

Figure 4:
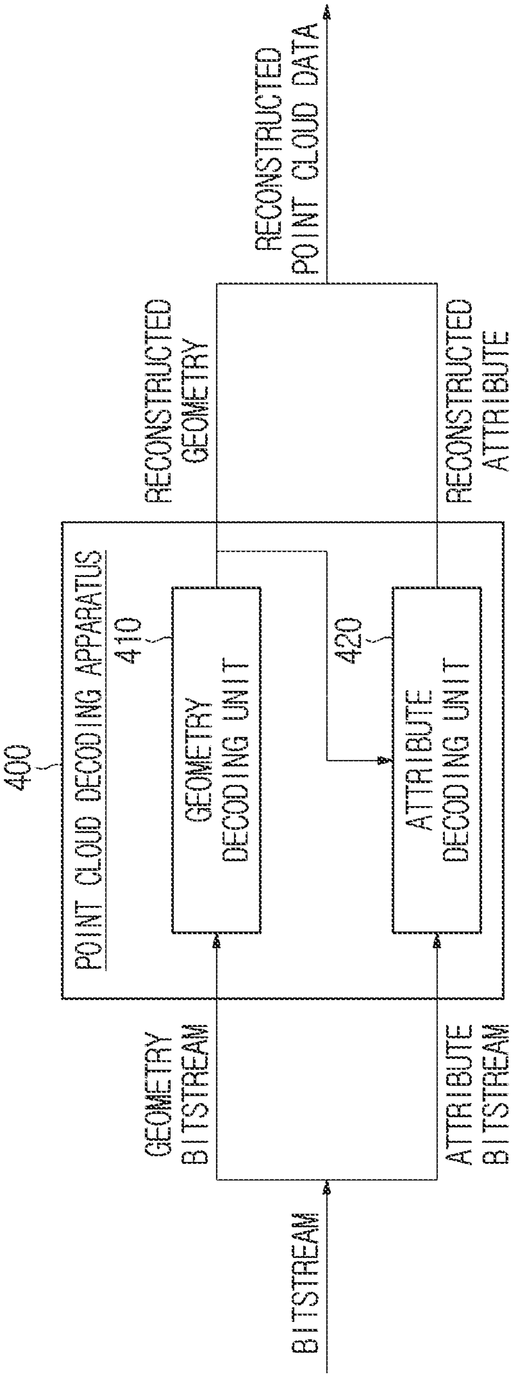
FIG. 4 is a block diagram illustrating an example of a point cloud decoding apparatus according to embodiments of the present disclosure.

FIG. 4 illustrates an example of a point cloud decoding apparatus 400 according to an embodiment of the present disclosure. The point cloud decoding apparatus 400 of FIG. 4 may correspond to the decoding unit 23 of FIG. 1 in terms of configuration and function.

The point cloud decoding apparatus 400 may perform a decoding process based on data (bitstream) transmitted from the transmission device 10. The decoding process may include a process of reconstructing (decoding) a point cloud video by performing operation corresponding to the above-described encoding operation on the bitstream.

As illustrated in FIG. 4, the decoding process may include a geometry decoding process and an attribute decoding process. The geometry decoding process may be performed by a geometry decoding unit 410, and an attribute decoding process may be performed by an attribute decoding unit 420. That is, the point cloud decoding apparatus 400 may include the geometry decoding unit 410 and the attribute decoding unit 420.

The geometry decoding unit 410 may reconstruct geometry from a geometry bitstream, and the attribute decoder 420 may reconstruct attribute based on the reconstructed geometry and the attribute bitstream. Also, the point cloud decoding apparatus 400 may reconstruct a three-dimensional point cloud video (point cloud data) based on position information according to the reconstructed geometry and attribute information according to the reconstructed attribute.

Figure 5:
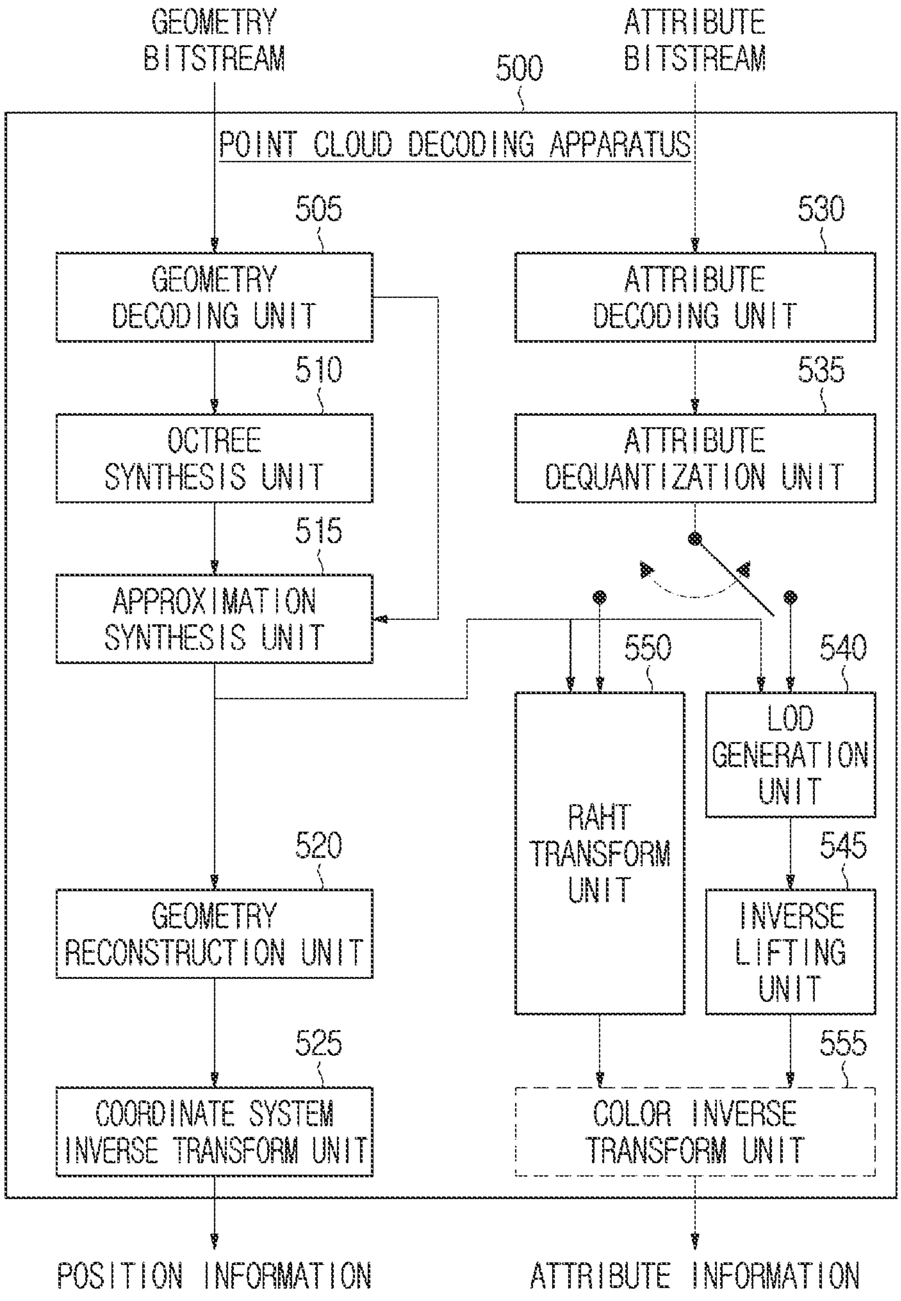
FIG. 5 is a block diagram illustrating another example of a point cloud decoding apparatus according to embodiments of the present disclosure.

FIG. 5 illustrates a specific example of a point cloud decoding apparatus 500 according to another embodiment of the present disclosure. As illustrated in FIG. 5, the point cloud decoding apparatus 500 includes a geometry decoding unit 505, an octree synthesis unit 510, an approximation synthesis unit 515, a geometry reconstruction unit 520, and a coordinate system inverse transform unit 525, an attribute decoding unit 530, an attribute inverse quantization unit 535, a RATH transform unit 550, an LOD generation unit 540, an inverse lifting unit 545, and/or a color inverse transform unit 555.

The geometry decoding unit 505, the octree synthesis unit 510, the approximation synthesis unit 515, the geometry reconstruction unit 520 and the coordinate system inverse transform unit 550 may perform geometry decoding. Geometry decoding may be performed as a reverse process of the geometry coding described with reference to FIGS. 1 to 3. Geometry decoding may include direct coding and trisoup geometry decoding. Direct coding and trisoup geometry decoding may be selectively applied.

The geometry decoding unit 505 may decode the received geometry bitstream based on arithmetic coding. Operation of the geometry decoding unit 505 may correspond to a reverse process of operation performed by the geometry encoding unit 325.

The octree synthesis unit 510 may generate an octree by obtaining an occupancy code from the decoded geometry bitstream (or information on a geometry obtained as a result of decoding). Operation of the octree synthesis unit 510 may correspond to a reverse process of operation performed by the octree analysis unit 515.

The approximation synthesis unit 515 may synthesize a surface based on the decoded geometry and/or the generated octree, when trisoup geometry encoding is applied.

The geometry reconstruction unit 520 may reconstruct geometry based on the surface and the decoded geometry. When direct coding is applied, the geometry reconstruction unit 520 may directly bring and add position information of points to which direct coding is applied. In addition, when trisoup geometry encoding is applied, the geometry reconstruction unit 520 may reconstruct the geometry by performing reconstruction operation, for example, triangle reconstruction, up-sampling, voxelization operation and the like. The reconstructed geometry may include a point cloud picture or frame that does not include attributes.

The coordinate system inverse transform unit 550 may acquire positions of points by transforming the coordinate system based on the reconstructed geometry. For example, the coordinate system inverse transform unit 550 may inversely transform the positions of points from a three-dimensional space (e.g., a three-dimensional space expressed by the coordinate system of X-axis, Y-axis, and Z-axis, etc.) to position information of the global space coordinate system.

The attribute decoding unit 530, the attribute inverse quantization unit 535, the RATH transform unit 530, the LOD generator 540, the inverse lifting unit 545 and/or the color inverse transform unit 550 may perform attribute decoding. Attribute decoding may include RAHT transform decoding, predictive transform decoding, and lifting transform decoding. The above three types of decoding may be selectively used, or a combination of one or more types of decoding may be used.

The attribute decoding unit 530 may decode an attribute bitstream based on arithmetic coding. For example, when there is no neighbor point in the predictor of each point and thus the attribute value of the current point is directly entropy-encoded, the attribute decoding unit 530 may decode the attribute value (non-quantized attribute value) of the current point. As another example, when there are neighbor points in the predictor of the current points and thus the quantized residual attribute value is entropy-encoded, the attribute decoding unit 530 may decode the quantized residual attribute value.

The attribute inverse quantization unit 535 may dequantize the decoded attribute bitstream or information on the attribute obtained as a result of decoding, and output dequantized attributes (or attribute values). For example, when the quantized residual attribute value is output from the attribute decoding unit 530, the attribute inverse quantization unit 535 may dequantize the quantized residual attribute value to output the residual attribute value. The dequantization process may be selectively applied based on whether the attribute is encoded in the point cloud encoding apparatus 300. That is, when there is no neighbor point in the predictor of each point and thus the attribute value of the current point is directly encoded, the attribute decoding unit 530 may output the attribute value of the current point that is not quantized, and the attribute encoding process may be skipped.

The RATH transform unit 550, the LOD generation unit 540, and/or the inverse lifting unit 545 may process the reconstructed geometry and dequantized attributes. The RATH transform unit 550, the LOD generation unit 540, and/or the inverse lifting unit 545 may selectively perform decoding operation corresponding to the encoding operation of the point cloud encoding apparatus 300.

The color inverse transform unit 555 may perform inverse transform coding for inverse transforming s color value (or texture) included in the decoded attributes. Operation of the inverse color transform unit 555 may be selectively performed based on whether the color transform unit 335 operates.

Figure 6:
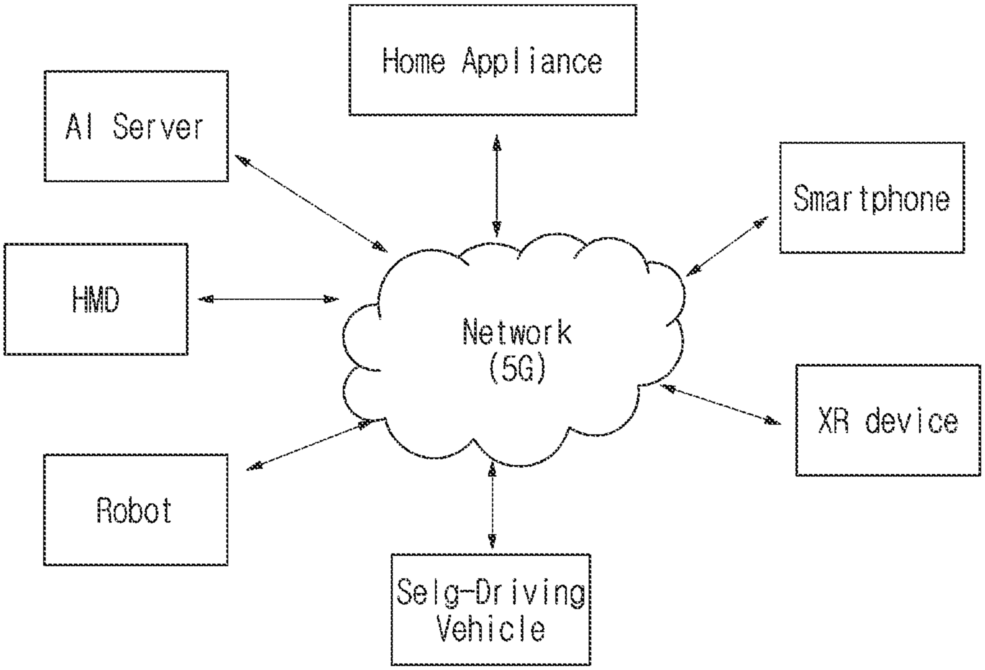
FIG. 6 illustrates an example of a structure capable of interworking with a method/device for transmitting and receiving point cloud data according to embodiments of the present disclosure.

FIG. 6 illustrates an example of a structure capable of interworking with a method/device for transmitting and receiving point cloud data according to embodiments of the present disclosure.

The structure of FIG. 6 illustrates a configuration in which at least one of a server (AI Server), a robot, a self-driving vehicle, an XR device, a smartphone, a home appliance and/or a HMD is connected to a cloud network. The robot, the self-driving vehicle, the XR device, the smartphone, or the home appliance may be referred to as a device. In addition, the XR device may correspond to a point cloud data device (PCC) according to embodiments or may interwork with the PCC device.

The cloud network may refer to a network that forms part of the cloud computing infrastructure or exists within the cloud computing infrastructure. Here, the cloud network may be configured using a 3G network, a 4G or Long Term Evolution (LTE) network, or a 5G network.

The server may be connected to at least one of the robot, the self-driving vehicle, the XR device, the smartphone, the home appliance, and/or the HMD through a cloud network, and may help at least a part of processing of the connected devices.

The HMD may represent one of the types in which an XR device and/or the PCC device according to embodiments may be implemented. The HMD type device according to the embodiments may include a communication unit, a control unit, a memory unit, an I/O unit, a sensor unit, and a power supply unit.

<PCC+XR>

The XR/PCC device may be implemented by a HMD, a HUD provided in a vehicle, a TV, a mobile phone, a smartphone, a computer, a wearable device, a home appliance, a digital signage, a vehicle, a fixed robot or a mobile robot, etc., by applying PCC and/or XR technology.

The XR/PCC device may obtain information on a surrounding space or a real object by analyzing 3D point cloud data or image data acquired through various sensors or from an external device to generate position (geometric) data and attribute data for 3D points, and render and output an XR object to be output. For example, the XR/PCC device may output an XR object including additional information on the recognized object in correspondence with the recognized object.

<PCC+XR+Mobile Phone>

The XR/PCC device may be implemented by a mobile phone or the like by applying PCC technology. A mobile phone can decode and display point cloud content based on PCC technology.

<PCC+Self-Driving+XR>

The self-driving vehicle may be implemented by a mobile robot, a vehicle, an unmanned aerial vehicle, etc. by applying PCC technology and XR technology. The self-driving vehicle to which the XR/PCC technology is applied may mean a self-driving vehicle equipped with a unit for providing an XR image or a self-driving vehicle which is subjected to control/interaction within the XR image. In particular, the self-driving vehicle which is subjected to control/interaction within the XR image is distinguished from the XR device and may be interwork with each other.

The self-driving vehicle equipped with a unit for providing an XR/PCC image may acquire sensor information from sensors including a camera, and output an XR/PCC image generated based on the acquired sensor information. For example, the self-driving vehicle has a HUD and may provide a passenger with an XR/PCC object corresponding to a real object or an object in a screen by outputting an XR/PCC image.

In this case, when the XR/PCC object is output to the HUD, at least a portion of the XR/PCC object may be output so as to overlap an actual object to which a passenger's gaze is directed. On the other hand, when the XR/PCC object is output to a display provided inside the self-driving vehicle, at least a portion of the XR/PCC object may be output to overlap the object in the screen. For example, the self-driving vehicle may output XR/PCC objects corresponding to objects such as a lane, other vehicles, traffic lights, traffic signs, two-wheeled vehicles, pedestrians, and buildings.

The VR technology, AR technology, MR technology, and/or PCC technology according to the embodiments are applicable to various devices. That is, VR technology is display technology that provides objects or backgrounds in the real world only as CG images. On the other hand, AR technology refers to technology that shows a virtual CG image on top of an actual object image. Furthermore, MR technology is similar to AR technology described above in that a mixture and combination of virtual objects in the real world is shown. However, in AR technology, the distinction between real objects and virtual objects made of CG images is clear, and virtual objects are used in a form that complements the real objects, whereas, in MR technology, virtual objects are regarded as equivalent to real objects unlike the AR technology. More specifically, for example, applying the MR technology described above is a hologram service. VR, AR and MR technologies may be integrated and referred to as XR technology.

Space Partition

Point cloud data (i.e., G-PCC data) may represent volumetric encoding of a point cloud consisting of a sequence of frames (point cloud frames). Each point cloud frame may include the number of points, the positions of the points, and the attributes of the points. The number of points, the positions of the points, and the attributes of the points may vary from frame to frame. Each point cloud frame may mean a set of three-dimensional points specified by zero or more attributes and Cartesian coordinates (x, y, z) of three-dimensional points in a particular time instance. Here, the Cartesian coordinates (x, y, z) of the three-dimensional points may be a position or a geometry.

In some embodiments, the present disclosure may further perform a space partition process of partitioning the point cloud data into one or more 3D blocks before encoding the point cloud data. The 3D block may mean whole or part of a 3D space occupied by the point cloud data. The 3D block may be one or more of a tile group, a tile, a slice, a coding unit (CU), a prediction unit (PU), or a transform unit (TU).

A tile corresponding to a 3D block may mean whole or part of the 3D space occupied by the point cloud data. Also, a slice corresponding to a 3D block may mean whole or part of a 3D space occupied by the point cloud data. A tile may be partitioned into one or more slices based on the number of points included in one tile. A tile may be a group of slices with bounding box information. The bounding box information of each tile may be specified in a tile inventory (or a tile parameter set, a tile parameter set (TPS)). A tile may overlap another tile in the bounding box. A slice may be a unit of data on which encoding is independently performed, or a unit of data on which decoding is independently performed. That is, a slice may be a set of points that may be independently encoded or decoded. In some embodiments, a slice may be a series of syntax elements representing part or whole of a coded point cloud frame. Each slice may include an index for identifying a tile to which the slice belongs.

The spatially partitioned 3D blocks may be processed independently or non-independently. For example, spatially partitioned 3D blocks may be encoded or decoded independently or non-independently, respectively, and may be transmitted or received independently or non-independently, respectively. In addition, the spatially partitioned 3D blocks may be quantized or dequantized independently or non-independently, and may be transformed or inversely transformed independently or non-independently, respectively. In addition, spatially partitioned 3D blocks may be rendered independently or non-independently. For example, encoding or decoding may be performed in units of slices or units of tiles. In addition, quantization or dequantization may be performed differently for each tile or slice, and may be performed differently for each transformed or inversely transformed tile or slice.

In this way, when the point cloud data is spatially partitioned into one or more 3D blocks and the spatially partitioned 3D blocks are processed independently or non-independently, the process of processing the 3D blocks is performed in real time and the process is performed with low latency. In addition, random access and parallel encoding or parallel decoding in a three-dimensional space occupied by point cloud data may be enabled, and errors accumulated in the encoding or decoding process may be prevented.

Figure 7:
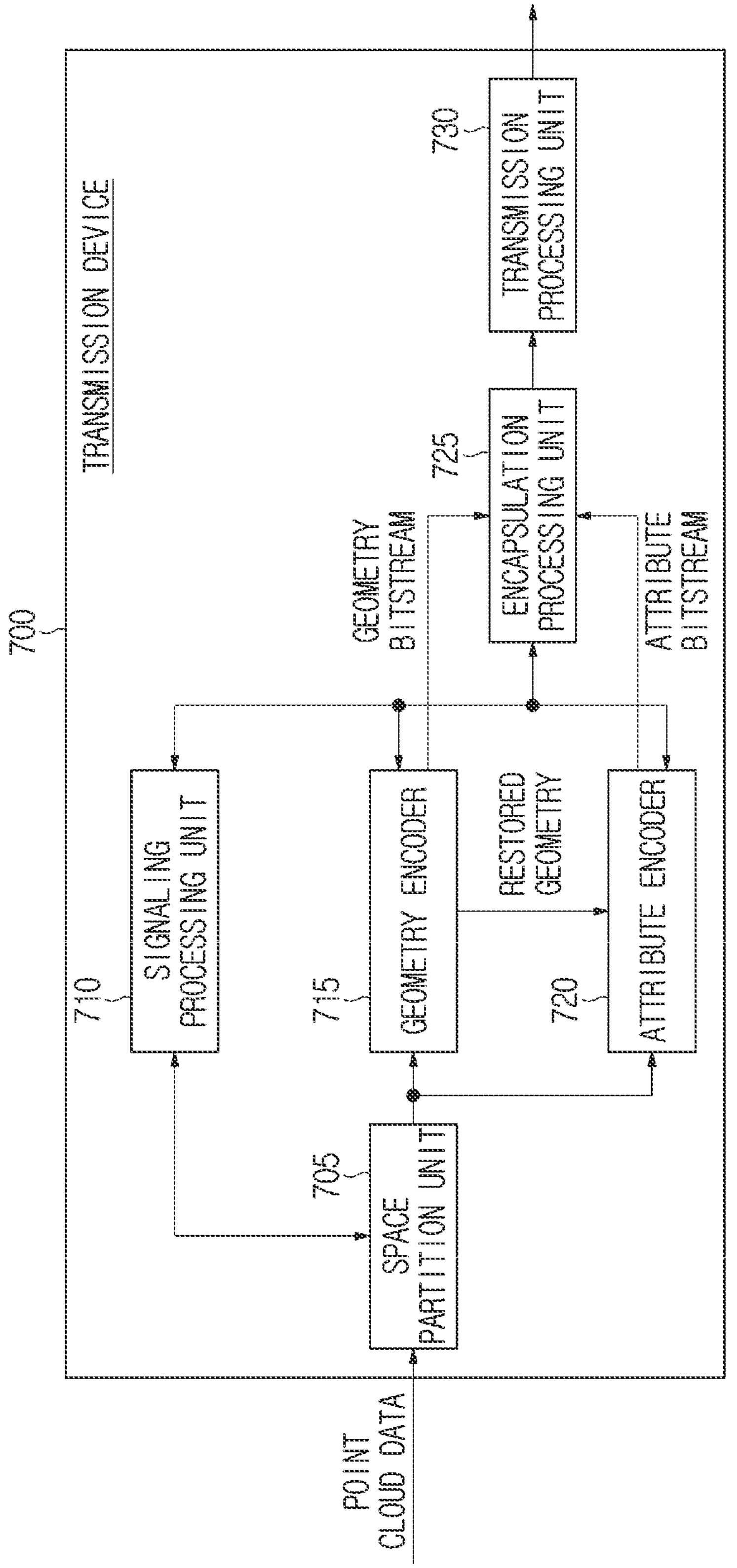
FIG. 7 is a block diagram showing another example of a transmission device according to embodiments of the present disclosure.

FIG. 7 is a block diagram illustrating an example of a transmission device 700 for performing a space partition process according to embodiments of the present disclosure. As illustrated in FIG. 7, the transmission device 700 may include a space partition unit 705 for performing a space partition process, a signaling processing unit 710, a geometry encoder 715, an attribute encoder 720, and an encapsulation processing unit 725 and/or a transmission processing unit 730.

The space partition unit 705 may perform a space partition process of partitioning the point cloud data into one or more 3D blocks based on a bounding box and/or a sub-bounding box. Through the space partition process, point cloud data may be partitioned into one or more tiles and/or one or more slices. In some embodiments, the point cloud data may be partitioned into one or more tiles, and each partitioned tile may be further partitioned into one or more slices, through a space partition process.

The signaling processing unit 710 may generate and/or process (e.g., entropy-encode) signaling information and output it in the form of a bitstream. Hereinafter, a bitstream (in which signaling information is encoded) output from the signaling processing unit is referred to as a 'signaling bitstream'. The signaling information may include information for space partition or information on space partition. That is, the signaling information may include information related to the space partition process performed by the space partition unit 705.

When the point cloud data is partitioned into one or more 3D blocks, information for decoding some point cloud data corresponding to a specific tile or a specific slice among the point cloud data may be required. In addition, in order to support spatial access (or partial access) to point cloud data, information related to 3D spatial areas may be required. Here, the spatial access may mean extracting, from a file, only necessary partial point cloud data in the entire point cloud data. The signaling information may include information for decoding some point cloud data, information related to 3D spatial areas for supporting spatial access, and the like. For example, the signaling information may include 3D bounding box information, 3D spatial area information, tile information, and/or tile inventory information.

The signaling information may be provided from the space partition unit 705, the geometry encoder 715, the attribute encoder 720, the transmission processing unit 725, and/or the encapsulation processing unit 730. In addition, the signaling processing unit 710 may provide the feedback information fed back from the reception device 700 of FIG. 13 to the space partition unit 705, the geometry encoder 715, the attribute encoder 720, the transmission processing unit 725 and/or the encapsulation processing unit 730.

The signaling information may be stored and signaled in a sample in a track, a sample entry, a sample group, a track group, or a separate metadata track. In some embodiments, the signaling information may be signaled in units of sequence parameter sets (SPSs) for signaling of a sequence level, geometry parameter sets (GPSs) for signaling of geometry coding information, and attribute parameter sets (APSs) for signaling of attribute coding information, tile parameter sets (TPSs) (or tile inventory) for signaling of a tile level, etc. In addition, the signaling information may be signaled in units of coding units such as slices or tiles.

Meanwhile, positions (position information) of the 3D blocks may be output to the geometry encoder 715, and attributes (attribute information) of the 3D blocks may be output to the attribute encoder 720.

The geometry encoder 715 may construct an octree based on the position information, encode the constructed octree, and output a geometry bitstream. Also, the geometry encoder 715 may reconstruct the octree and/or the approximated octree and output it to the attribute encoder 720. The reconstructed octree may be reconstructed geometry. The geometry encoder 715 may perform all or some of operations performed by the coordinate system transform unit 305, the geometry quantization unit 310, the octree analysis unit 315, the approximation unit 320, the geometry encoding unit 325 and/or the reconstruction unit 330 of FIG. 3.

The attribute encoder 720 may output an attribute bitstream by encoding an attribute based on the reconstructed geometry. The attribute encoder 720 may perform all or some of operations performed by the attribute transform unit 340, the RAHT transform unit 345, the LOD generation unit 350, the lifting unit 355, the attribute quantization unit 360, the attribute encoding unit 365 and/or the color transform nit 335 of FIG. 3.

The encapsulation processing unit 725 may encapsulate one or more input bitstreams into a file or segment. For example, the encapsulation processing unit 725 may encapsulate each of the geometry bitstream, the attribute bitstream, and the signaling bitstream, or multiplex and encapsulate the geometry bitstream, the attribute bitstream, and the signaling bitstream. In some embodiments, the encapsulation processing unit 725 may encapsulate a bitstream (G-PCC bitstream) consisting of a sequence of a type-length-value (TLV) structure into a file. TLV (or TLV encapsulation) structures constituting the G-PCC bitstream may include a geometry bitstream, an attribute bitstream, a signaling bitstream, and the like. In some embodiments, the G-PCC bitstream may be generated by the encapsulation processing unit 725 or generated by the transmission processing unit 930. In some embodiments, the encapsulation processing unit 725 may perform all or some of operations performed by the encapsulation processing unit 13 of FIG. 1.

The transmission processing unit 730 may process an encapsulated bitstream or a file/segment according to an arbitrary transport protocol. The transmission processing unit 730 may perform all or some of operations performed by the transmission unit 14 and the transmission processing unit described with reference to FIG. 1.

Figure 8:
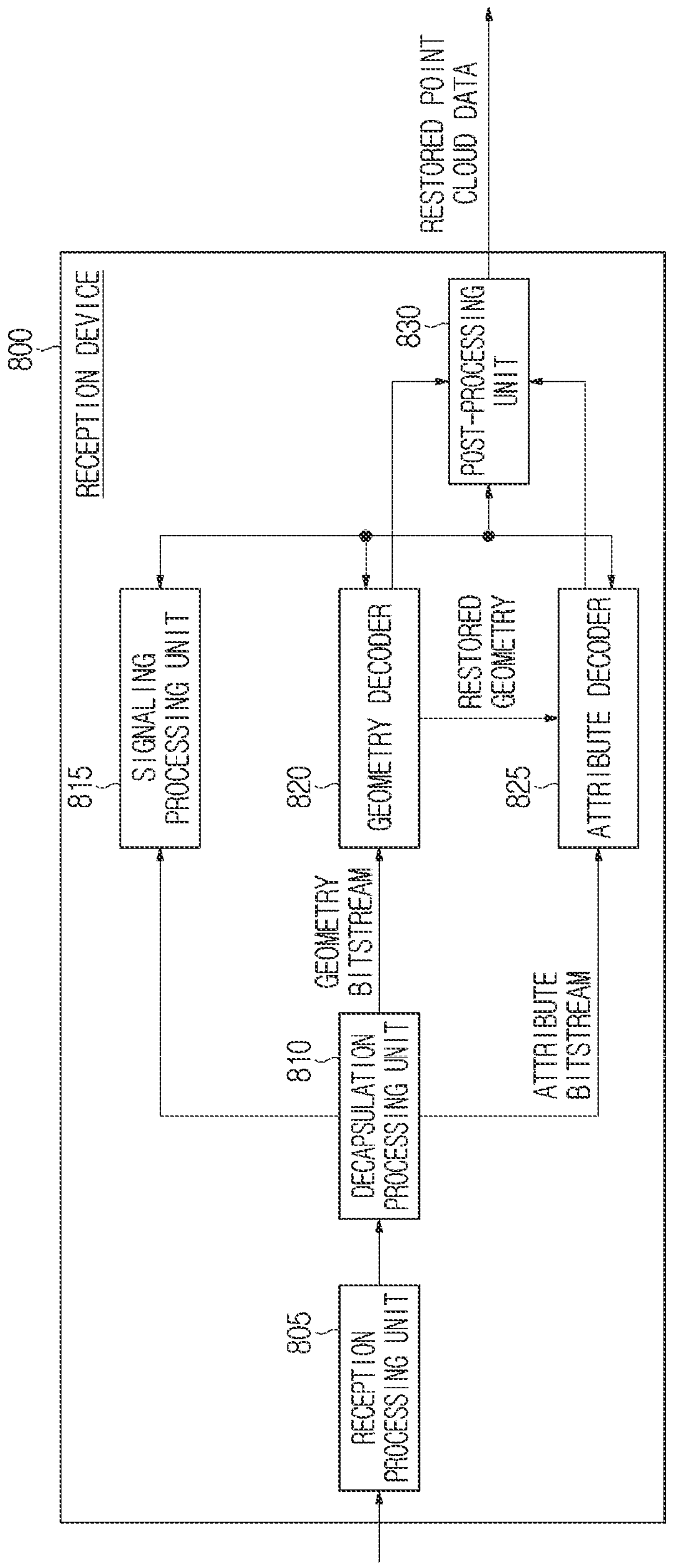
FIG. 8 is a block diagram showing another example of a reception device according to embodiments of the present disclosure.

FIG. 8 is a block diagram illustrating an example of a reception device 800 according to embodiments of the present disclosure. The reception device 800 may perform operations corresponding to the operations of the transmission device 700 for performing space partition. As illustrated in FIG. 8, the reception device 800 may include a reception processing unit 805, a decapsulation processing unit 810, a signaling processing unit 815, a geometry decoder 820, an attribute encoder 825, and/or a post-processing unit 830.

The reception processing unit 805 may receive a file/segment in which a G-PCC bitstream is encapsulated, a G-PCC bitstream, or a bitstream, and may process it according to a transport protocol. The reception processing unit 805 may perform all or some of operations performed by the reception unit 21 and the reception processing unit described with reference to FIG. 1.

The decapsulation processing unit 810 may obtain a G-PCC bitstream by performing a reverse process of operations performed by the encapsulation processing unit 925. The decapsulation processing unit 810 may obtain a G-PCC bitstream by decapsulating the file/segment. For example, the decapsulation processing unit 810 may obtain and output a signaling bitstream to the signaling processing unit 815, obtain and output a geometry bitstream to the geometry decoder 820, and obtain and output an attribute bitstream to the attribute decoder 825. The decapsulation processing unit 810 may perform all or some of operations performed by the decapsulation processing unit 22 of FIG. 1.

The signaling processing unit 815 may parse and decode signaling information by performing a reverse process of operations performed by the signaling processing unit 710. The signaling processing unit 815 may parse and decode signaling information from a signaling bitstream. The signaling processing unit 815 may provide the decoded signaling information to the geometry decoder 820, the attribute decoder 820, and/or the post-processing unit 830.

The geometry decoder 820 may reconstruct geometry from the geometry bitstream by performing a reverse process of operations performed by the geometry encoder 715. The geometry decoder 820 may reconstruct geometry based on signaling information (parameters related to the geometry).

The attribute decoder 825 may reconstruct attribute from the attribute bitstream by performing a reverse process of the operations performed by the attribute encoder 720. The attribute decoder 825 may reconstruct the attribute based on the signaling information (parameters related to the attribute) and the reconstructed geometry.

The post-processing unit 830 may reconstruct point cloud data based on the reconstructed geometry and the reconstructed attribute. Reconstruction of point cloud data may be performed through a process of matching the reconstructed geometry with the reconstructed attribute. In some embodiments, when the reconstructed point cloud data is in units of tiles and/or slices, the post-processing unit 830 may reconstruct the bounding box of the point cloud data, by performing a reverse process of the space partition process of the transmission device 700 based on signaling information. In some embodiments, when the bounding box is partitioned into a plurality of tiles and/or a plurality of slices through a space partition process, the post-processing unit 830 may reconstruct part of the bounding box, by combining some slices and/or some tiles based on the signaling information. Here, some slices and/or some tiles used to reconstruct the bounding box may be slices and/or some tiles related to a 3D spatial area in which spatial access is desired.

TLV Structure

As described above, a G-PCC bitstream may mean a bitstream of point cloud data consisting of a sequence of TLV structures. A TLV structure may be referred to as "TLV encapsulation structure", "G-PCC TLV encapsulation structure" or "G-PCC TLV structure".

Figure 9:
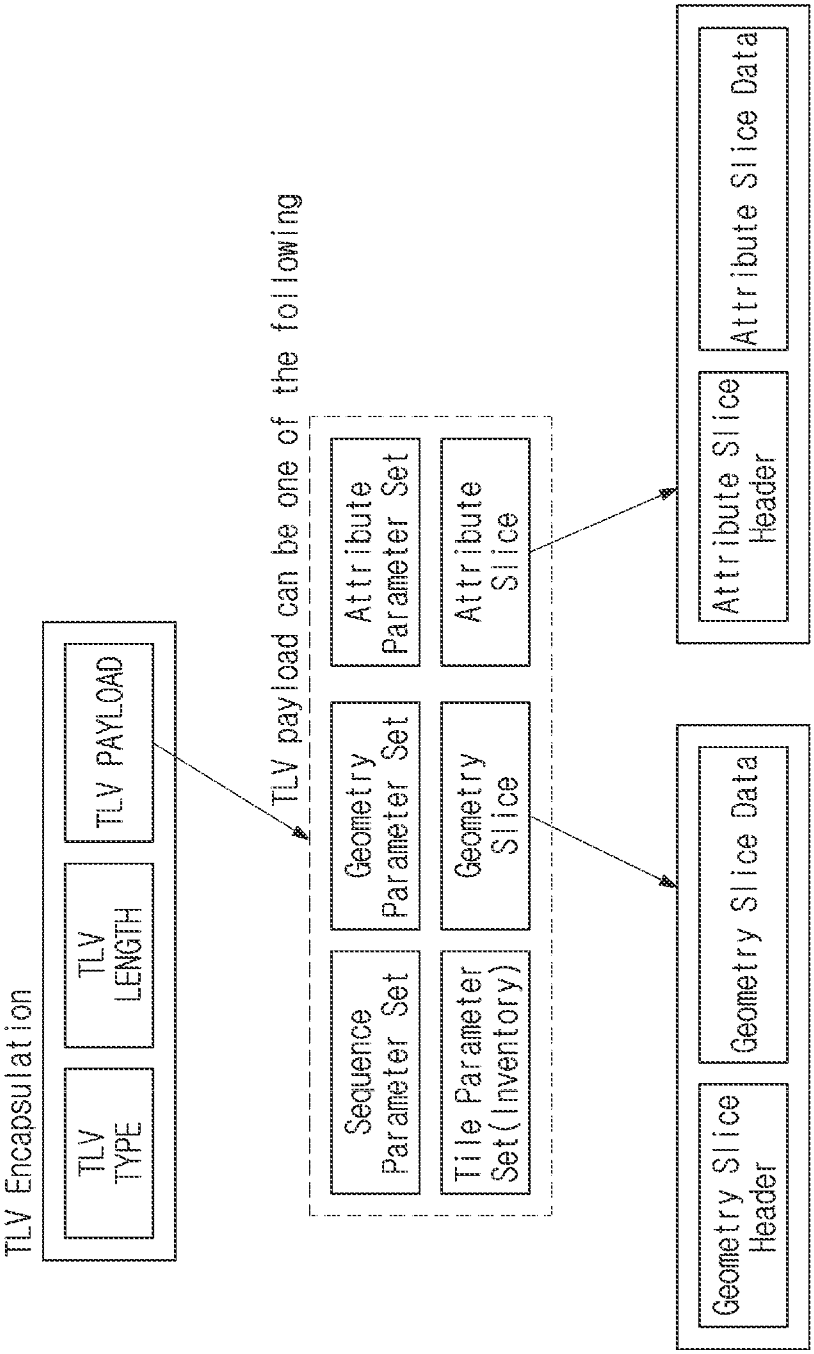
FIG. 9 illustrates an example for a TLV encapsulation structure according to embodiments of the present disclosure.

An example of a TLV encapsulation structure is shown in FIG. 9, an example of a syntax structure of TLV encapsulation is shown in FIG. 10A, and an example of a payload type of a TLV encapsulation structure is shown in FIG. 10B. Each TLV encapsulation structure may consist of a TLV type (TLV TYPE), a TLV length (TLV LENGTH) and/or a TLV payload (TLV PAYLOAD). The TLV type may be type information of the TLV payload, the TLV length may be length information of the TLV payload, and the TLV payload may be a payload (or, payload bytes). In the TLV encapsulation syntax structure (tlv_encapsulation( )) exemplified in FIG. 10A, tlv_type may indicate type information of a TLV payload, and tlv_num_payload_bytes may indicate length information of a TLV payload. In addition, tlv_payload_byte [i] may indicate a TLV payload. tlv_payload_byte[i] may be signaled as much as a value of tv_num_payload_bytes, and i may increase from 0 to (tlv_num_payload_bytes−1) by 1.

TLV payloads may include an SPS, a GPS, one or more APSs, a tile inventory, a geometry slice, one or more attribute slices, and one or more metadata slices. According to embodiments, the TLV payload of each TLV encapsulation structure may include, according to type information of the TLV payload, one of an SPS, a GPS, one or more APSs, a tile inventory, a geometry slice, one or more attribute slices, and one or more metadata slices. Data included in a TLV payload may be distinguished through type information of the TLV payload. For example, as exemplified in FIG. 10B, if the value of tlv_type is 0, it may indicate that data included in a TLV payload is an SPS, and if the value of tlv_type is 1, it may indicate that data included in a TLV payload is a GPS. If the value of tlv_type is 2, it may indicate that data included in a TLV payload is a geometry slice, and if the value of tlv_type is 3, it may indicate that data included in a TLV payload is an APS. IF the value of tlv_type is 4, it may indicate that data included in a TLV payload is an attribute slice, and if the value of tlv_type is 5, it may indicate that data included in a TLV payload is a tile inventory (or tile parameter set). IF the value of tlv_type is 6, it may indicate that data included in a TLV payload is a frame boundary marker, and if the value of tlv_type is 7, it may indicate that data included in a TLV payload is a metadata slice. A payload of a TLV encapsulation structure may observe a format of the High Efficiency Video Coding (HEVC) Network Abstraction Layer (NAL) unit.

Encapsulation/Decapsulation

The G-PCC bitstream composed of TLV encapsulation structures may be transmitted to the reception device without change, or may be encapsulated and transmitted to the reception device. For example, the encapsulation processing unit 725 may encapsulate a G-PCC bitstream composed of TLV encapsulation structures in the form of a file/segment and transmit it. The decapsulation processing unit 810 may acquire a G-PCC bitstream by decapsulating the encapsulated file/segment.

In some embodiments, the G-PCC bitstream may be encapsulated in an ISOBMFF-based file format. In this case, the G-PCC bitstream may be stored in a single track or multiple tracks in the ISOBMFF file. Here, the single track or multiple tracks in a file may be referred to as "tracks" or "G-PCC tracks". The ISOBMFF-based file may be referred to as a container, a container file, a media file, a G-PCC file, and the like. Specifically, the file may be composed of boxes and/or information that may be referred to as flyp, moov, mdat, and the like.

The ftyp box (file type box) may provide file type or file compatibility related information for the file. The reception device may identify the file by referring to the flyp box. The mdat box is also called a media data box and may include actual media data. In some embodiments, a geometry slice (or coded geometry bitstream) and zero or more attribute slices (or coded attribute bitstream) may be included in a sample of an mdat box in a file. Here, the sample may be referred to as a G-PCC sample. The moov box is also called a movie box, and may include metadata for media data of the file. For example, the moov box may include information necessary for decoding and playback of the media data, and may include information on tracks and samples of the file. The moov box may act as a container for all metadata. The moov box may be a box of the uppermost layer among metadata-related boxes.

In some embodiments, the moov box may include a track (trak) box providing information related to a track of a file, and the trak box may include a media (mdia) box (MediaBox) providing media information of the track, and a track reference container (tref) box for linking (referencing) the track and a sample of a file corresponding to the track. The media box MediaBox may include a media information container (minf) box that provides information on the media data and a handler (hdlr) box that indicates a stream type. The minf box may include a sample table (stbl) box that provides metadata related to a sample of the mdat box. The stbl box may include a sample description (stsd) box that provides information on a used coding type and initialization information required for the coding type. In some embodiments, a sample description (stsd) box may include a sample entry for a track. In some embodiments, signaling information (or metadata) such as SPS, GPS, APS, and tile inventory may be included in a sample entry of a moov box or a sample of an mdat box in a file.

A G-PCC track may be defined as a volumetric visual track carrying a geometry slice (or coded geometry bitstream) or attribute slice (or coded attribute bitstream), or both a geometry slice and an attribute slice. In some embodiments, the volumetric visual track may be identified by a volumetric visual media handler type 'volv' in a handler box HandlerBox of a media box (MediaBox) and/or a volumetric visual media header vvhd in a minf box of a media box MediaBox. The minf box may be referred to as a media information container or a media information box. The minf box may be included in the media box MediaBox, the media box MediaBox may be included in the track box, and the track box may be included in the moov box of the file. A single volumetric visual track or multiple volumetric visual tracks may be present in a file.

Sample Group

The encapsulation processing unit mentioned in the present disclosure may generate a sample group by grouping one or more samples. The encapsulation processing unit, the metadata processing unit, or the signaling processing unit mentioned in the present disclosure may signal signaling information associated with a sample group in a sample, a sample group, or a sample entry. That is, the sample group information associated with the sample group may be added to a sample, a sample group, or a sample entry. The sample group information may be 3D bounding box sample group information, 3D region sample group information, 3D tile sample group information, 3D tile inventory sample group information, and the like.

Track Group

The encapsulation processing unit mentioned in the present disclosure may generate a track group by grouping one or more tracks. The encapsulation processing unit, the metadata processing unit, or the signaling processing unit mentioned in the present disclosure may signal signaling information associated with a track group in a sample, a track group, or a sample entry. That is, the track group information associated with the track group may be added to a sample, track group or sample entry. The track group information may be 3D bounding box track group information, point cloud composition track group information, spatial region track group information, 3D tile track group information, 3D tile inventory track group information, and the like.

Sample Entry

Figure 11:
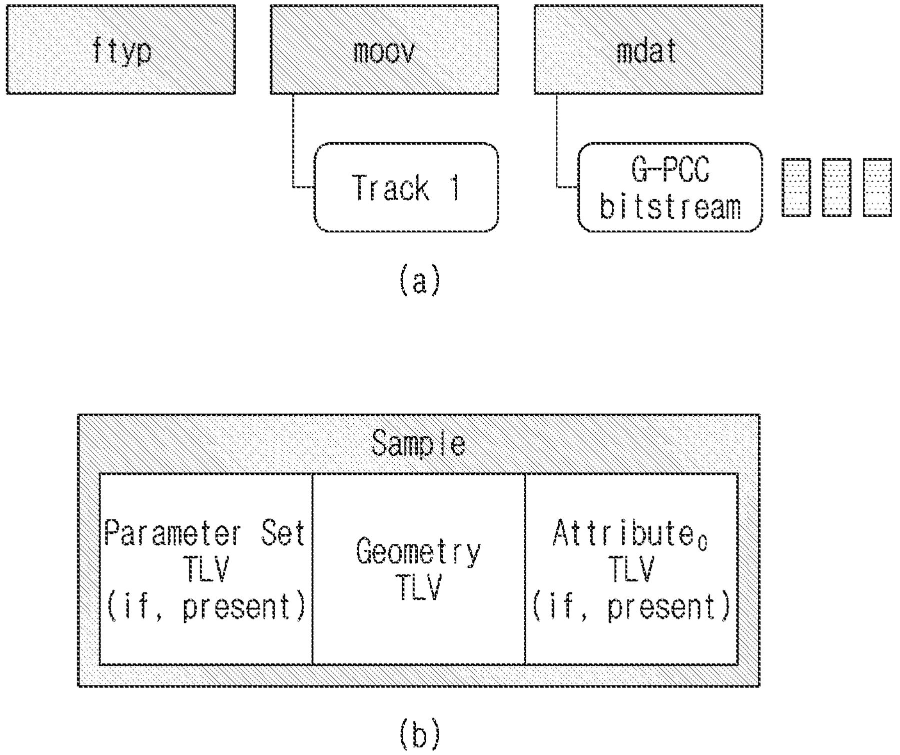
FIG. 11 illustrates an example for a tile including a single track according to embodiments of the present disclosure.
Figure 12:
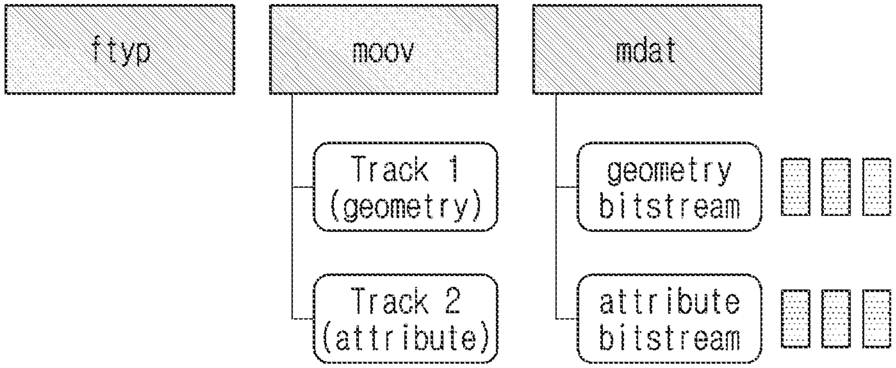
FIG. 12 illustrates an example for a tile including multiple tracks according to embodiments of the present disclosure.
Figure 12:
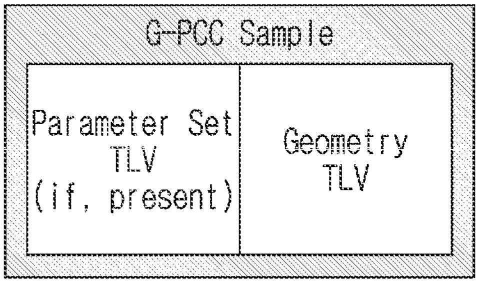

FIG. 11 is a diagram for explaining an ISOBMFF-based file including a single track. (a) of FIG. 11 illustrates an example of the layout of an ISOBMFF-based file including a single track, and (b) of FIG. 11 illustrates an example of a sample structure of a mdat box when a G-PCC bitstream is stored in a single track of a file. FIG. 12 is a diagram for explaining an ISOBMFF-based file including multiple tracks. (a) of FIG. 12 illustrates an example of the layout of an ISOBMFF-based file including multiple tracks, and (b) of FIG. 12 illustrates an example of a sample structure of a mdat box when a G-PCC bitstream is stored in a single track of a file.

The stsd box (SampleDescriptionBox) included in the moov box of the file may include a sample entry for a single track storing the G-PCC bitstream. The SPS, GPS, APS, tile inventory may be included in a sample entry in a moov box or a sample in an mdat box in a file. Also, geometry slices and zero or more attribute slices may be included in the sample of the mdat box in the file. When a G-PCC bitstream is stored in a single track of a file, each sample may contain multiple G-PCC components. That is, each sample may be composed of one or more TLV encapsulation structures. The sample entry of a single entry may be defined as follows.

Sample Entry Type: ‘gpel’, ‘gpeg’

Container: SampleDescriptionBox

Mandatory: A ‘gpel’ or ‘gpeg’ sample entry is mandatory

Quantity: One or more sample entries may be present

The sample entry type ‘gpel’ or ‘gpeg’ is necessary, and there may be one or more sample entries. A G-PCC track may use VolumetricVisualSampleEntry having the sample entry type of ‘gpel’ or ‘gpeg’. The sample entry of a G-PCC track may include a G-PCC decoding configuration box (GPCCConfigurationBox), and the G-PCC decoding configuration box may include a G-PCC decoder configuration record (GPCCDecoderConfigurationRecord( )). GPCCDecoderConfigurationRecord( ) may include at least one of configurationVersion, profile_idc, profile_compatibility_flags, level_idc, numOfSetupUnitArrays, SetupUnitType, completeness, numOfSepupUnit, and setupUnit. A setupUnit array field included in GPCCDecoderConfigurationRecord( ) may include TLV encapsulation structures including one SPS.

When a sample entry type is ‘gpel’, all the parameter sets such as SPS, GPS, APS and a tile inventory may be included in the array of setupUints. When a sample entry type is ‘gpeg’, the above parameter sets may be included in the array (that is, sample entry) of setupUints or be included in a corresponding stream (that is, sample). An example of the syntax of a G-PCC sample entry (GPCCSampleEntry) having the sample entry type of ‘gpel’ may be described as follows.

```
aligned(8) class GPCCSampleEntry( )
extends VolumetricVisualSampleEntry (‘gpel’) {
GPCCConfigurationBox config; //mandatory
3DBoundingBoxInfoBox( );
CubicRegionInfoBox( );
TileInventoryBox( );
}
```

A G-PCC sample entry (GPCCSampleEntry) having the sample entry type of ‘gpel’ may include GPCCConfigurationBox, 3DBoundingBoxInfoBox( ), CubicRegionInfoBox( ), and TileInventoryBox( ). 3DBoundingBoxInfoBox( ) may indicate 3D bounding box information of point cloud data related to samples that are carried by a corresponding track. CubicRegionInfoBox( ) may include one or more pieces of spatial region information of point cloud data that are carried to samples within the corresponding track. TileInventoryBox( ) may indicate 3D tile inventory information of point cloud data that have been carried to samples within the corresponding track.

As illustrated in (b) of FIG. 12, the sample may include TLV encapsulation structures including a geometry slice. In addition, a sample may include TLV encapsulation structures including one or more parameter sets. In addition, a sample may include TLV encapsulation structures including one or more attribute slices.

As illustrated in (a) of FIG. 12, when a G-PCC bitstream is carried by multiple tracks of an ISOBMFF-based file, each geometry slice or attribute slice may be mapped to an individual track. For example, a geometry slice may be mapped to track 1, and an attribute slice may be mapped to track 2. The track (track 1) carrying the geometry slice may be referred to as a geometry track or a G-PCC geometry track, and the track (track 2) carrying the attribute slice may be referred to as an attribute track or a G-PCC attribute track. In addition, the geometry track may be defined as a volumetric visual track carrying a geometry slice, and the attribute track may be defined as a volumetric visual track carrying an attribute slice.

A track carrying part of a G-PCC bitstream including both a geometry slice and an attribute slice may be referred to as a multiplexed track. In the case where the geometry slice and attribute slice are stored on separate tracks, each sample in the track may include at least one TLV encapsulation structure carrying data of a single G-PCC component. In this case, each sample contains neither geometry nor attributes, and may not contain multiple attributes. Multi-track encapsulation of a G-PCC bitstream may enable a G-PCC player to effectively access one of the G-PCC components. When the G-PCC bitstream is carried by multiple tracks, the following conditions need to be satisfy to effectively access one of the G-PCC components.

a) When a G-PCC bitstream consisting of TLV encapsulation structures is carried by multiple tracks, a track carrying a geometry bitstream (or a geometry slice) becomes an entry point.

b) In a sample entry, a new box is added to indicate the role of a stream included in a corresponding track. The new box may be the above-described G-PCC component type box (GPCCComponentTypeBox). That is, GPCCComponentTypeBox may be included in the sample entry for multiple tracks.

c) Track reference is introduced from a track carrying a G-PCC geometry bitstream alone to a track carrying a G-PCC attribute bitsteam.

GPCCComponentTypeBox may include GPCCComponentTypeStruct( ). When GPCCComponentTypeBox is present in a sample entry of tracks carrying a part or whole of a G-PCC bitstream, GPCCComponentTypeStruct( ) may indicate one or more types of G-PCC components (e.g., geometry, attribute) carried by each track. For example, when the value of gpcc_type field included in GPCCComponentTypeStruct( ) is 2, it may indicate a geometry component, and when the value is 4, it may indicate an attribute component. In addition, when the value of gpcc_type field indicates 4, that is, an attribute component, it may further include AttrIdx field that indicates an identifier of an attribute signaled in SPS( ).

When a G-PCC bitstream is carried by multiple tracks, the syntax of a sample entry may be defined as follows.

Sample Entry Type: ‘gpel’, ‘gpeg’, ‘gpcl’ or ‘gpcg’

Container: SampleDescriptionBox

Mandatory: ‘gpc1’. ‘gpcg’ sample entry is mandatory

Quantity: One or more sample entries may be present

Sample entry types ‘gpcl’, ‘gpcg’, ‘gpcl’ or ‘gpcg’ are necessary, and there may be one or more sample entries. Multiple tracks (e.g., geometry or attribute tracks) may use VolumetricVisualSampleEntry with a sample entry type of ‘gpcl’, ‘gpcg’, ‘gpcl’ or ‘gpcg’. In a ‘gpel’ sample entry, every parameter set may be present in a setupUnit array. In a 'gpeg' sample entry, a parameter set may be present in a corresponding array or stream. In a 'gpel' or 'gpeg' sample entry. GPCCComponentTypeBox may have not to be present. In a 'gpcl' sample entry, an SPS, a GPS and a tile inventory may be present in a SetupUnit array of a track that carries a G-PCC geometry bitstream. Every related APS may be present in a SetupUnit array of a track that carries a G-PCC attribute bitstream. In a 'gpcg' sample entry, an SPS, a GPS, an APS or a tile inventory may be present in a corresponding array or stream. In a 'gpcl' or 'gpcg' sample array, GPCCComponentTypeBox may have not to be present.

An example of the syntax of a G-PCC sample entry is as follows.

```
aligned(8) class GPCCSampleEntry( )
extends VolumetricVisualSampleEntry (codingname) {
GPCCConfigurationBox       config; //mandatory
GPCCComponentTypeBox    type;   // optional
}
```

compressorname of the base class VolumetricVisualSampleEntry, that is, codingname may indicate the name of a compressor used together with a recommended "W013GPCC coding". In "W013GPCC coding", the first byte (an octal number of 13 or a decimal number of 11 marked by W013) is the number of the remaining bytes and may indicate a byte number of the remaining string, congif may include G-PCC decoder configuration information, info may indicate G-PCC component information that is carried in each track. info may indicate a component tile that is carried in a track and may also indicate the attribute name, index and attribute type of a G-PCC component that is carried in a G-PCC attribute track.

Reference Between Tracks

When a G-PCC bitstream is carried in multiple tracks (that is, a G-PCC geometry bitstream and an attribute bitstream are carried in tracks that are different (separate) from each other), a track reference tool may be used to connect the tracks. One TrackReferenceTypeBoxes may be added to TrackReferenceBox in TrackBox of a G-PCC track. TrackReferenceTypeBox may include an array of track_IDs that designate tracks referred to by the G-PCC track.

According to embodiments, the present disclosure may provide a device and methods for supporting temporal scalability of the carriage of G-PCC data (hereinafter, this may be referred to as a G-PCC bitstream, an encapsulated G-PCC bitstream, or a G-PCC file). In addition, the present disclosure may propose a device and methods for providing a point cloud content service that efficiently stores a G-PCC bitstream in a single track within a file or splits and stores the G-PCC bitstream in a plurality of tracks and provides signaling thereof. In addition, the present disclosure proposes a device and methods for processing a file storage technique for supporting efficient access to the stored G-PCC bistream.

Temporal Scalability

Temporal scalability may refer to a function that allows the possibility of extracting one or more subsets of independently coded frames. Also, temporal scalability may refer to a function of dividing G-PCC data into a plurality of different temporal levels and independently processing each G-PCC frame belonging to different temporal levels. If temporal scalability is supported, the G-PCC player (or the transmission device and/or the reception device of the present disclosure) may effectively access a desired component (target component) among G-PCC components. In addition, if temporal scalability is supported, since G-PCC frames are processed independently of each other, temporal scalability support at the system level may be expressed as more flexible temporal sub-layering. In addition, if temporal scalability is supported, the system (the point cloud content provision system) that processes G-PCC data can manipulate data at a high level to match network capability or decoder capability, the performance of the point cloud content provision system can be improved.

Sample Grouping

For a method for supporting temporal scalability, there may be a sample grouping method and a track grouping method. The sample grouping method may be a method of grouping samples within a G-PCC file according to a temporal level, and the track grouping method may be a method of grouping tracks within a G-PCC file according to a temporal level.

A sample group may be used to connect samples and temporal levels designated to the samples. That is, a sample group may indicate which sample belongs to which temporal level. In addition, a sample group may be information on a result of grouping one or more samples in one or more temporal levels. Sample groups may be referred to as 'tele' sample group and temporal level sample group 'tele'.

Information on Sample Group

Information on a sample group may include information on a result of sample grouping. Accordingly, information on a sample group may be information to be used for connecting samples and temporal levels designated to the samples. That is, information on a sample group may indicate which sample belongs to which temporal level and may be information on a result of grouping one or more samples in one or more temporal levels.

Information on a sample group may be present in tracks including a geometry data unit. When G-PCC data is carried in multiple tracks, information on a sample group may be present only in a geometry track in order to group each sample in a track by a temporal level. Samples in attribute tracks may be inferred based on the relationship with a geometry track related to the samples. For example, samples in attribute tracks may belong to a same temporal level as samples in a geometry track related thereto.

When information on a sample group is present in a G-PCC tile track referred to by a G-OCC tile base track, information on the sample group may have to be present in the rest tile track referred to by the G-PCC tile base track. Herein, the G-PCC tile track may be a volumetric visual track carrying every G-PCC component or a single G-PCC component corresponding to one or more G-PCC tiles. In addition, the G-PCC tile base track may be a volumetric visual track carrying every parameter set corresponding to a G-PCC tile track and a tile inventory.

Information on Temporal Level

In order to describe temporal scalability supported by a G-PCC file, information on a temporal level may be signaled. Information on the temporal level may be present in a sample entry of a track including a sample group (or information on a sample group). For example, information on the temporal level may be present in GPCCDecoderConfigurationRecord) or be present in a G-PCC scalability information box (GPCCScalabilityInfoBox) that signals scalability information for a G-PCC track.

Temporal Scalability Track Grouping

Temporal level tracks carrying a geometry component of a G-PCC bitstream may be grouped into a G-PCC temporal scalability track group.

When a G-PCC bitstream is encapsulated using multiple temporal level tracks and there are one or more alternative tracks for the temporal level tracks, all the temporal level tracks including a geometry component of a same G-PCC bitstream may be grouped into a same G-PCC temporal scalability track group. Herein, when combining two or more temporal level tracks, temporal scalability track grouping may prevent a file parser from mixing temporal tracks in the alternative tracks.

Problems of the Related Art

A GPCC temporal scalability group box (GPCCTemporalScalabilityGroupBox) may be a box including information that groups temporal level tracks. A syntax structure of a GPCC temporal scalability group box may be as follows.

```
aligned(8) class GPCCTemporalScalabilityGroupBox
extends TrackGroupTypeBox('gtsg') {
// track_group_id is inherited from TrackGroupTypeBox;
}
```

In the syntax structure above, track_group_id may be an identifier indicating a group to which a track belongs.

A GPCC temporal scalability group box (GPCCTemporalScalabilityGroupBox) may be present in a track with a sample type of 'gpcl' or 'gpcg'. However, it is not clear whether the GPCC temporal scalability group box may be present in a track with a sample type of 'gpel' or 'gpeg'.

A GPCC temporal scalability group box may be present in a temporal level track including a geometry component, but it is not clear whether the GPCC temporal scalability group box may be present in a temporal level track including an attribute component. In addition, when the GPCC temporal scalability group box is present in the temporal level track including the attribute component, it is still clear how to handle such information.

EMBODIMENT

In order to solve these problems, the present disclosure proposes 1) a GPCC temporal scalability group box may be present in a track with a sample entry type being one of 'gpel', 'gpeg', 'gpcl' or 'gpcg'. In addition, the present disclosure proposes 2) when a sample entry type of a track is one of 'gpcl' or 'gpcg' and the track is a geometry track including a geometry component, a GPCC temporal scalability group box may be present in the track. In addition, the present disclosure proposes that when a sample entry type of a track is one of 'gpcl' or 'gpcg' and the track is an attribute track including an attribute component, a GPCC temporal scalability group box may not be present in the track. In addition, the present disclosure proposes 3) attribute tracks may be combined based on a combination of geometry tracks included in a same temporal scalability track group.

Hereinafter, the proposals 1) to 3) will be described by different embodiments.

Embodiment 1

Figure 13:
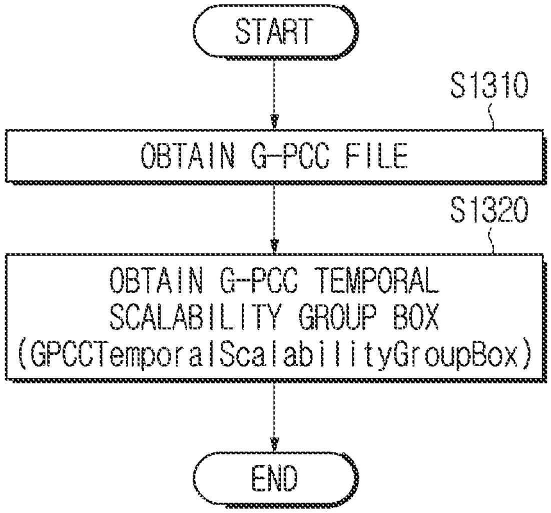
FIG. 13 is a flowchart of a method for obtaining a temporal scalability group box GPCCTemporalScalabilityGroupBox in a reception device according to embodiments of the present disclosure.

Embodiment 1 is an embodiment relates to a sample entry type of a track that may include a temporal scalability group box. FIG. 13 is a flowchart of a method performed in the reception device 20 according to Embodiment 1, and FIG. 14 is a flowchart of a method performed in the transmission device 10 according to Embodiment 1.

Referring to FIG. 13, the reception device 20 may obtain a G-PCC file (S1310). The G-PCC file may include point cloud data, temporal level number information of a track, temporal scalability track group information and the like.

The reception device 20 may obtain a G-PCC temporal scalability group box from a track included in the G-PCC file (S1320). Herein, a sample entry type of the track including the G-PCC temporal scalability group box may be any one of 'gpel', 'gpeg', 'gpcl' or 'gpcg'. That is, the temporal scalability group box may be included not only in a track with a sample entry type of 'gpcl' or 'gpcg' but also in a track with a sample entry type of 'gpel' or 'gpeg'.

Figure 14:
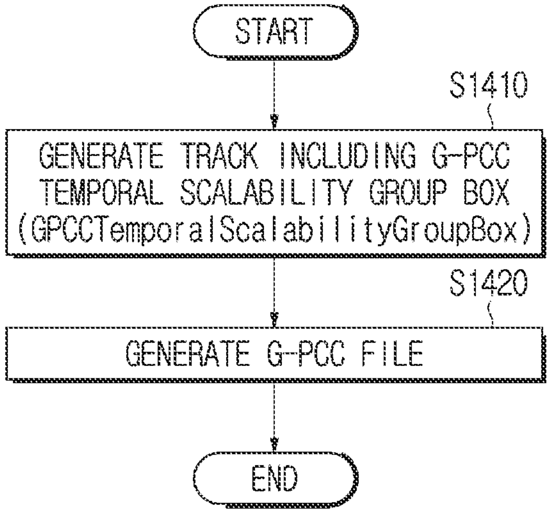
FIG. 14 is a flowchart of a method for generating a G-PCC file in a transmission device according to embodiments of the present disclosure.

Referring to FIG. 14, the transmission device 10 may generate a track including a G-PCC temporal scalability group box (GPCCTemporalScalabilityGroupBox) (S1410). Herein, a sample entry type of the track may be any one of 'gpel', 'gpeg', 'gpcl' or 'gpcg'. That is, the temporal scalability group box may be included not only in a track with a sample entry type of 'gpcl' or 'gpcg' but also in a track with a sample entry type of 'gpel' or 'gpeg'.

Next, the transmission device 10 may generate a G-PCC file including the generated track (S1420).

Thus, according to the embodiment of the present disclosure, a GPCC temporal scalability group box may be included not only in a track with a sample entry type of 'gpcl' or 'gpcg' but also in a track with a sample entry type of 'gpel' or 'gpeg'. Accordingly, according to an embodiment of the present disclosure, it is possible to solve the problem of the related art, that is, unclarity regarding whether a GPCC temporal scalability group box is capable of being present in a track when a sample entry type is 'gpel' or 'gpeg'.

Embodiment 2

Figure 15:
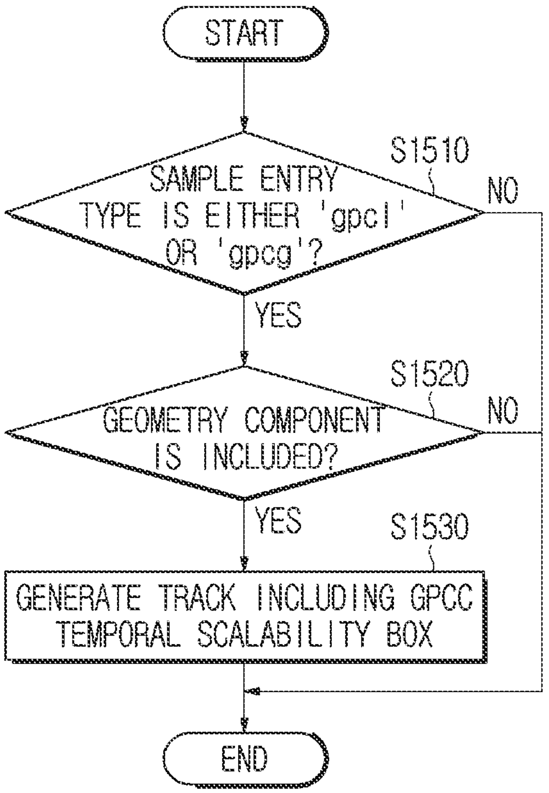
FIG. 15 to FIG. 16 are flowcharts of a method for generating a G-PCC file in a transmission device according to embodiments of the present disclosure.
Figure 16:
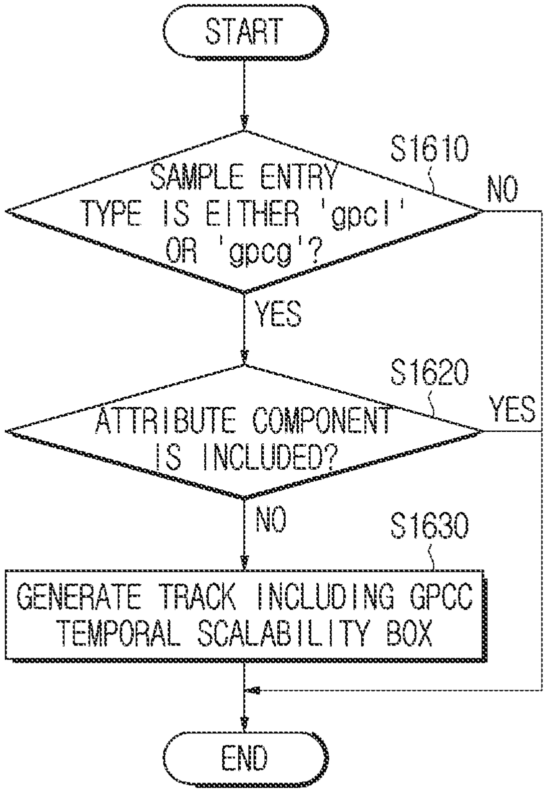
Figure 17:
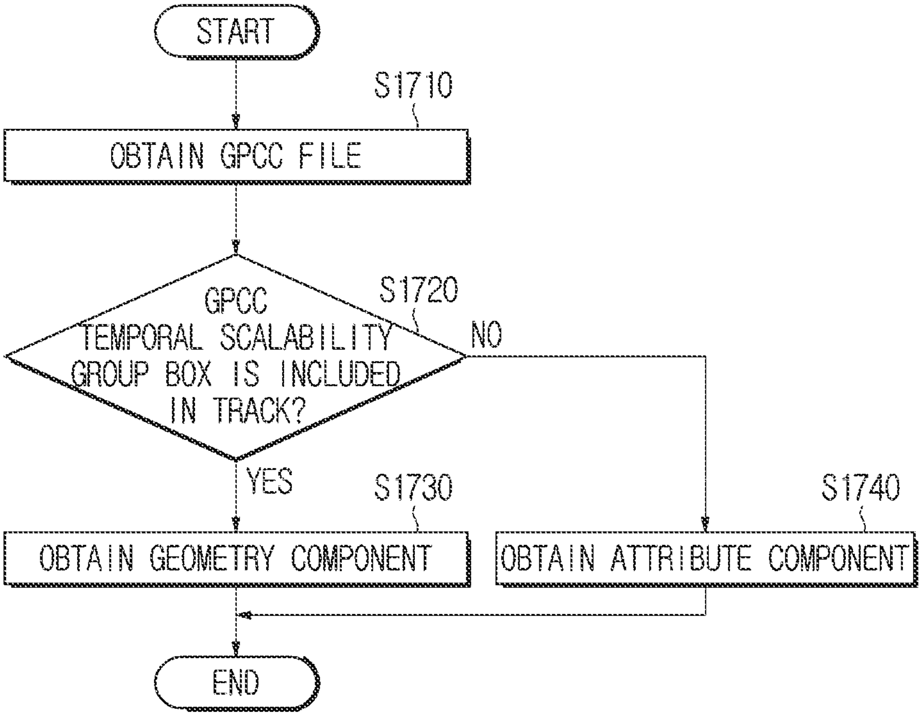
FIG. 17 is a flowchart of a method for obtaining a geometry/attribute component in a reception device according to embodiments of the present disclosure.

Embodiment 2 is an embodiment related to a sample entry type of a track capable of including a temporal scalability group box and a type of the track. FIG. 15 and FIG. 16 are flowcharts of a method performed in the transmission device 10 according to Embodiment 2, and FIG. 17 is a flowchart of a method performed in the reception device 20 according to Embodiment 2.

Referring to FIG. 15, the transmission device 10 may check whether a sample entry type of a track is one of 'gpcl' or 'gpcg' (S1510). If the sample entry type of the track is neither 'gpcl' nor 'gpcg' (NO at step S1510), the transmission device 10 may generate a track in which a GPCC temporal scalability group box is not included. Alternatively, if the sample entry type of the track is neither 'gpcl' nor 'gpcg' (NO at step S1510), the process may be terminated. On the other hand, if the sample entry type of the track is one of 'gpcl' and 'gpcg' (YES at step S1510), the transmission device 10 may check whether the track includes a geometry component (S1520).

If the track includes no geometry component (NO at step S1520), the transmission device 10 may generate a track in which a GPCC temporal scalability group box is not included. Alternatively, if the track includes no geometry component (NO at step S1520), the process may be terminated. On the other hand, if the track includes a geometry component (YES at step S1520), the transmission device 10 may generate a track including a G-PCC temporal scalability group box (S1530).

According to another embodiment of the present disclosure, the order of steps S1510 and S1520 may be changed.

That is, the transmission device 10 may first check whether a geometry component is included and then identify a sample entry type. That is, if the sample entry type of a sample is one of 'gpcl' or 'gpcg' and a geometry component is included, a track including a GPCC temporal scalability box may be generated.

Referring to FIG. 16, the transmission device 10 may check whether a sample entry type of a track is one of 'gpcl' or 'gpcg' (S1610). If the sample entry type of the track is neither 'gpcl' nor 'gpcg' (NO at step S1610), the transmission device 10 may generate a track in which a GPCC temporal scalability group box is not included. Alternatively, if the sample entry type of the track is neither 'gpcl' nor 'gpcg' (NO at step S1610), the process may be terminated. On the other hand, if the sample entry type of the track is one of 'gpcl' and 'gpcg' (YES at step S1610), the transmission device 10 may check whether the track includes an attribute component (S1620).

If the track includes an attribute component (YES at step S1620), the transmission device 10 may generate a track in which a GPCC temporal scalability group box is not included. Alternatively, if the track includes an attribute component (YES at step S1620), the process may be terminated. On the other hand, if the track includes no attribute component (NO at step S1620), the transmission device 10 may generate a track including a G-PCC temporal scalability group box (S1630).

According to another embodiment of the present disclosure, the order of steps S1610 and S1620 may be changed. That is, the transmission device 10 may first check whether an attribute component is included and then identify a sample entry type, but the present disclosure is not limited thereto. That is, if the sample entry type of the sample is neither 'gpcl' nor 'gpcg' or the track includes an attribute component, a track including a GPCC temporal scalability box may not be generated.

Referring to FIG. 17, the reception device 20 may obtain a GPCC file (S1710). Herein, the GPCC file may include point cloud data, temporal level number information of a track, temporal scalability track group information and the like.

The reception device 20 may check whether a GPCC temporal scalability group box is included in a track of the GPCC file (S1720). If the GPCC temporal scalability group box is included in the track (YES at step S1720), the reception device 20 may obtain a geometry component included in the track (S1730). On the other hand, if the GPCC temporal scalability group box is not included in the track (NO at step S1720), the reception device 20 may obtain an attribute component included in the track (S1740).

Thus, according to the embodiment of the present disclosure, whether a GPCC temporal scalability group box is included in a track may be different according to whether a sample entry type of the track and the track include a geometry component or an attribute component. Accordingly, according to the embodiment of the present disclosure, it is possible to solve the problem of the related art, that is, unclarity regarding whether a GPCC temporal scalability group box is capable of being included in a track when the track includes an attribute component.

Embodiment 3

Figure 18:
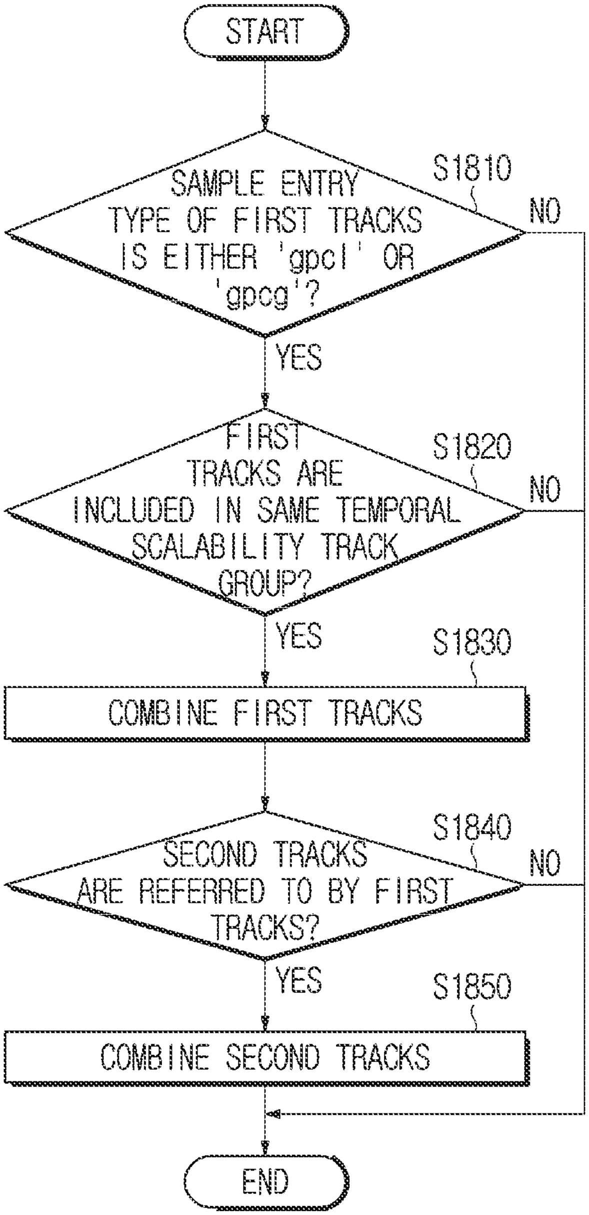
FIG. 18 is a flowchart of a method for combining tracks in a transmission device according to embodiments of the present disclosure.

Embodiment 3 is an embodiment related to a method of combining tracks including an attribute component based on a combination of tracks including a geometry component. 'Combination' mentioned in the present disclosure may mean 'grouping' and may be interpreted as 'tracking grouping' according to embodiments. FIG. 18 is a flowchart of a method performed in the transmission device 10 according to Embodiment 3.

Referring to FIG. 18, the transmission device 10 may check whether first tracks are included in a same temporal scalability track group (S1820). Herein, the first tracks may be tracks including a geometry component. That is, the first tracks may be geometry tracks. A geometry track may mean a track including a geometry component.

If the first tracks are not included in a same temporal scalability track group (NO at step S1820), the transmission device 10 may terminate the process. On the other hand, if the first tracks are included in a same temporal scalability track group (YES at step S1820), the transmission device 10 may combine the first tracks (S1830).

The transmission device 10 may check whether second tracks are referred to by the first tracks (S1840). Herein, the second tracks may be tracks including an attribute component. That is, the second tracks may be attribute tracks. An attribute track may mean a track including an attribute component.

If the second tracks are not referred to by the first tracks (NO at step S1840), the transmission device 10 may terminate the process. On the other hand, if the second tracks are referred to by the first tracks (YES at step S1840), the transmission device 10 may combine the second tracks (S1850). In this case, a combination method of the second tracks may be the same as a combination method of the first tracks. That is, according to the present disclosure, when the first tracks included in the same temporal scalability track group are combined, the second tracks referred to by the first tracks may be combined.

According to the present disclosure, before steps S1820 to S1850 are performed, the transmission device 10 may check whether a sample entry type of the first tracks is 'gpcl' or 'gpcg' (S1810). If the sample entry type of the first tracks is neither 'gpcl' nor 'gpcg' (NO at step S1810), the transmission device 10 may terminate the process. On the other hand, if the sample entry type of the first tracks is one of 'gpcl' or 'gpcg' (YES at step S1810), the transmission device 10 may check whether the first tracks are included in a same temporal scalability track group (S1820). Next, as described above, steps S1820 to S1850 may be performed.

That is, according to the present disclosure, when the sample entry type of the first tracks is any one of 'gpcl' or 'gpcg' and the first tracks are included in the same temporal scalability track group, the second tracks referred to by the first tracks may be combined based on the first tracks being combined.

According to an embodiment of the present disclosure, the reception device 20 may identify a track group identifier (track_group_id). Herein, the track group identifier may be present in a GPCC file that is obtained from the transmission device 10. Next, based on the track group identifier, the reception device 20 may determine a combination of the first tracks. The reception device 20 may determine a combination of the second tracks referred to by the first tracks according to a combination of the first tracks.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to provide point cloud content. In addition, the embodiments of the present disclosure may be used to encode/decode point cloud data.

The invention claimed is:

1. A method performed in a reception device of point cloud data, the method comprising:

obtaining a geometry-based point cloud compression (G-PCC) file including the point cloud data; and obtaining a G-PCC temporal scalability group box GPCCTemporalScalabilityGroupBox from a track in the G-PCC file, wherein the G-PCC temporal scalability group box GPCCTemporalScalabilityGroupBox is a box including information for grouping temporal level tracks, and wherein the G-PCC temporal scalability group box GPCCTemporalScalabilityGroupBox is present in the track with a sample entry type 'gpel' or 'gpeg'.

2. The method of claim 1, wherein the track includes a geometry component.

3. The method of claim 1, wherein, based on first tracks included in a same temporal scalability group box being combined, second tracks referred to by the first tracks are combined, the first tracks are tracks including a geometry component, and the second tracks are tracks including an attribute component.

4. A method performed in a transmission device of point cloud data, the method comprising:

generating a track including a G-PCC temporal scalability group box GPCCTemporalScalabilityGroupBox; and generating a G-PCC file including the track, wherein the G-PCC temporal scalability group box GPCCTemporalScalabilityGroupBox is a box including information for grouping temporal level tracks, and wherein the G-PCC temporal scalability group box GPCCTemporalScalabilityGroupBox is present in the track with a sample entry type 'gpel' or 'gpeg'.

5. A reception device of point cloud data, the reception device comprising:

a memory; and at least one processor, wherein the at least one processor is configured to:

obtain a geometry-based point cloud compression (G-PCC) file including the point cloud data, and obtain a G-PCC temporal scalability group box GPCCTemporalScalabilityGroupBox from a track in the G-PCC file, wherein the G-PCC temporal scalability group box GPCCTemporalScalabilityGroupBox is a box including information for grouping temporal level tracks, and wherein the G-PCC temporal scalability group box GPCCTemporalScalabilityGroupBox is present in the track with a sample entry type 'gpel' or 'gpeg'.

* * * * *